US011156786B2

(12) United States Patent
Moffat et al.

(10) Patent No.: US 11,156,786 B2
(45) Date of Patent: Oct. 26, 2021

(54) HIGH DENSITY OPTICAL FIBER FEEDTHROUGH

(71) Applicant: Lumentum Operations LLC, Milpitas, CA (US)

(72) Inventors: Steven Harold Moffat, Mississippi Mills (CA); Stephane McDermott, Ottawa (CA)

(73) Assignee: Lumentum Operations LLC, San Jose, CA (US)

( * ) Notice: Subject to any disclaimer, the term of this patent is extended or adjusted under 35 U.S.C. 154(b) by 1 day.

(21) Appl. No.: 16/686,933

(22) Filed: Nov. 18, 2019

(65) Prior Publication Data
US 2020/0088956 A1   Mar. 19, 2020

Related U.S. Application Data

(62) Division of application No. 15/820,165, filed on Nov. 21, 2017, now Pat. No. 10,481,344.

(51) Int. Cl.
*G02B 6/38* (2006.01)
*G02B 6/44* (2006.01)
(Continued)

(52) U.S. Cl.
CPC ............ *G02B 6/3881* (2013.01); *G02B 6/36* (2013.01); *G02B 6/3672* (2013.01); *G02B 6/443* (2013.01);
(Continued)

(58) Field of Classification Search
CPC ........ G02B 6/3881; G02B 6/36; G02B 6/372; G02B 6/443; G02B 6/25; G02B 6/3885; G02B 6/4248; G02B 6/4403
See application file for complete search history.

(56) References Cited

U.S. PATENT DOCUMENTS 4,296,996 A   10/1981   Niiro et al.
5,325,456 A    6/1994   Cullen et al.
(Continued)

FOREIGN PATENT DOCUMENTS

CN   102109644 A   6/2011
CN   102884459 A   1/2013
(Continued)

OTHER PUBLICATIONS

Scott R. Bickham, "Multimode and single-mode fibers for data center and high-performance computing applications," Proc. SPIE 9753, Optical Interconnects XVI, 97530R (Mar. 15, 2016); doi: 10.1117/12.2217882 (Year: 2016).*
(Continued)

*Primary Examiner* — Peter Radkowski
(74) *Attorney, Agent, or Firm* — Harrity & Harrity, LLP

(57) ABSTRACT

A method may include aligning a portion of each of a plurality of optical ribbons in a particular orientation or sequence using a set of alignment apparatus. The method may include stripping the portion of each of the plurality of optical ribbons to expose a cladding of each fiber of the plurality of optical ribbons using a set of stripping apparatus. The method may include hermetically sealing a tube around the portion of each of the plurality of optical ribbons using a set of sealing apparatus. The method may produce a hermetic optical fiber feedthrough.

20 Claims, 19 Drawing Sheets

(51) Int. Cl.
*G02B 6/36* (2006.01)
*G02B 6/25* (2006.01)
*G02B 6/42* (2006.01)

(52) U.S. Cl.
CPC .............. *G02B 6/25* (2013.01); *G02B 6/3885* (2013.01); *G02B 6/4248* (2013.01); *G02B 6/4403* (2013.01)

(56) References Cited

U.S. PATENT DOCUMENTS

| | | | |
|---|---|---|---|
| 5,389,312 A | 2/1995 | Lebby et al. | |
| 5,491,300 A | 2/1996 | Huppenthal et al. | |
| 5,588,086 A | 12/1996 | Fan et al. | |
| 5,692,086 A | 11/1997 | Beranek et al. | |
| 5,775,702 A | 7/1998 | Laeremans et al. | |
| 5,970,194 A | 10/1999 | Dunn et al. | |
| 6,216,939 B1 | 4/2001 | Thackara et al. | |
| 6,353,186 B1 | 3/2002 | Dams et al. | |
| 6,427,046 B1 | 7/2002 | Bickford et al. | |
| 6,445,869 B1 | 9/2002 | Tanner et al. | |
| 6,498,882 B1 | 12/2002 | Buckelew et al. | |
| 6,788,873 B2* | 9/2004 | Fritz | G02B 6/4248 385/138 |
| 6,823,127 B2 | 11/2004 | Nasiri et al. | |
| 6,857,790 B2 | 2/2005 | Fontecha et al. | |
| 6,886,992 B2 | 5/2005 | Grzegorzewska et al. | |
| 7,002,131 B1 | 2/2006 | Lewis et al. | |
| 7,103,257 B2 | 9/2006 | Donaldson et al. | |
| 7,164,142 B2 | 1/2007 | Vishnipolsky et al. | |
| 7,338,215 B2* | 3/2008 | Reynolds | G02B 6/3887 385/139 |
| 7,747,126 B2 | 6/2010 | Dunphy et al. | |
| 8,068,714 B2 | 11/2011 | Dunphy et al. | |
| 8,351,755 B2 | 1/2013 | Dunphy et al. | |
| 8,502,090 B2 | 8/2013 | Winship et al. | |
| 8,581,120 B2 | 11/2013 | Winship et al. | |
| 8,625,953 B2 | 1/2014 | Kobayashi et al. | |
| 9,389,382 B2 | 7/2016 | Blazer et al. | |
| 9,428,322 B2 | 8/2016 | Moffat et al. | |
| 9,664,867 B2 | 5/2017 | Moffat et al. | |
| 9,696,505 B2 | 7/2017 | Camarda et al. | |
| 9,851,511 B2* | 12/2017 | Li | G02B 6/3821 |
| 9,880,365 B2 | 1/2018 | Goutzoulis et al. | |
| 9,880,366 B2* | 1/2018 | Vallance | G02B 6/29367 |
| 9,989,716 B2 | 6/2018 | Camarda et al. | |
| 10,008,362 B1* | 6/2018 | Sprengers | H01J 37/185 |
| 10,274,683 B2* | 4/2019 | Li | G02B 6/3887 |
| 10,481,344 B2 | 11/2019 | Moffat et al. | |
| 10,718,914 B2* | 7/2020 | Li | G02B 6/4246 |
| 10,761,280 B2* | 9/2020 | Vallance | G02B 6/3881 |
| 2002/0051617 A1 | 5/2002 | Khan et al. | |
| 2002/0064338 A1 | 5/2002 | Hung et al. | |
| 2002/0150375 A1 | 10/2002 | Hung et al. | |
| 2003/0152356 A1* | 8/2003 | Fritz | G02B 6/4248 385/138 |
| 2003/0190135 A1 | 10/2003 | Moidu et al. | |
| 2004/0081420 A1 | 4/2004 | Nasiri et al. | |
| 2004/0136679 A1 | 7/2004 | Esposito et al. | |
| 2006/0204181 A1* | 9/2006 | Reynolds | G02B 6/3887 385/76 |
| 2007/0172175 A1 | 7/2007 | Imanbayev et al. | |
| 2008/0317427 A1 | 12/2008 | Rosiewicz et al. | |
| 2011/0158594 A1 | 6/2011 | Yalamanchili et al. | |
| 2011/0170833 A1 | 7/2011 | Moidu et al. | |
| 2011/0200288 A1 | 8/2011 | Poole et al. | |
| 2011/0280538 A1* | 11/2011 | Durrant | G02B 6/4448 385/138 |
| 2012/0015555 A1 | 1/2012 | Deimel et al. | |
| 2012/0155807 A1 | 6/2012 | Knapp et al. | |
| 2012/0263420 A1 | 10/2012 | Benton et al. | |
| 2013/0294732 A1* | 11/2013 | Li | G02B 6/428 385/83 |
| 2014/0029891 A1 | 1/2014 | Poole et al. | |
| 2014/0238741 A1 | 8/2014 | Willing et al. | |
| 2014/0241681 A1 | 8/2014 | Baldwin et al. | |
| 2014/0241693 A1 | 8/2014 | Engel et al. | |
| 2015/0293313 A1 | 10/2015 | Ott et al. | |
| 2016/0238804 A1* | 8/2016 | Li | G02B 6/4246 |
| 2016/0266335 A1* | 9/2016 | Durrant | G02B 6/4448 |
| 2016/0274310 A1* | 9/2016 | Li | G02B 6/3887 |
| 2016/0274318 A1 | 9/2016 | Vallance et al. | |
| 2017/0131492 A1* | 5/2017 | Vallance | G02B 6/4214 |
| 2018/0136411 A1* | 5/2018 | Li | G02B 6/4292 |
| 2018/0149817 A1* | 5/2018 | Vallance | G02B 6/4215 |
| 2018/0182514 A1* | 6/2018 | Sprengers | G02B 6/428 |
| 2018/0182594 A1* | 6/2018 | Sprengers | G02B 6/4248 |
| 2020/0003973 A1* | 1/2020 | Li | G02B 6/4253 |
| 2020/0003974 A1* | 1/2020 | Vallance | G02B 6/4215 |

FOREIGN PATENT DOCUMENTS

| | | |
|---|---|---|
| CN | 104487879 A | 4/2015 |
| CN | 106922179 A | 7/2017 |

OTHER PUBLICATIONS

Scott R. Bickham, Radawan Ripumaree, Julie A. Chalk, Mark T. Paap, William C. Hurley, Randy L. McClure, "Multimode fiber for high-density optical interconnects," Proc. SPIE 10109, Optical Interconnects XVII, 101090S (Feb. 20, 2017); doi: 10.1117/12.2255505 (Year: 2017).*

Wikipedia, "MIL-STD-883," https://en.wikipedia.org/wiki/MIL-STD-883, Jun. 17, 2017, 4 pages.

* cited by examiner

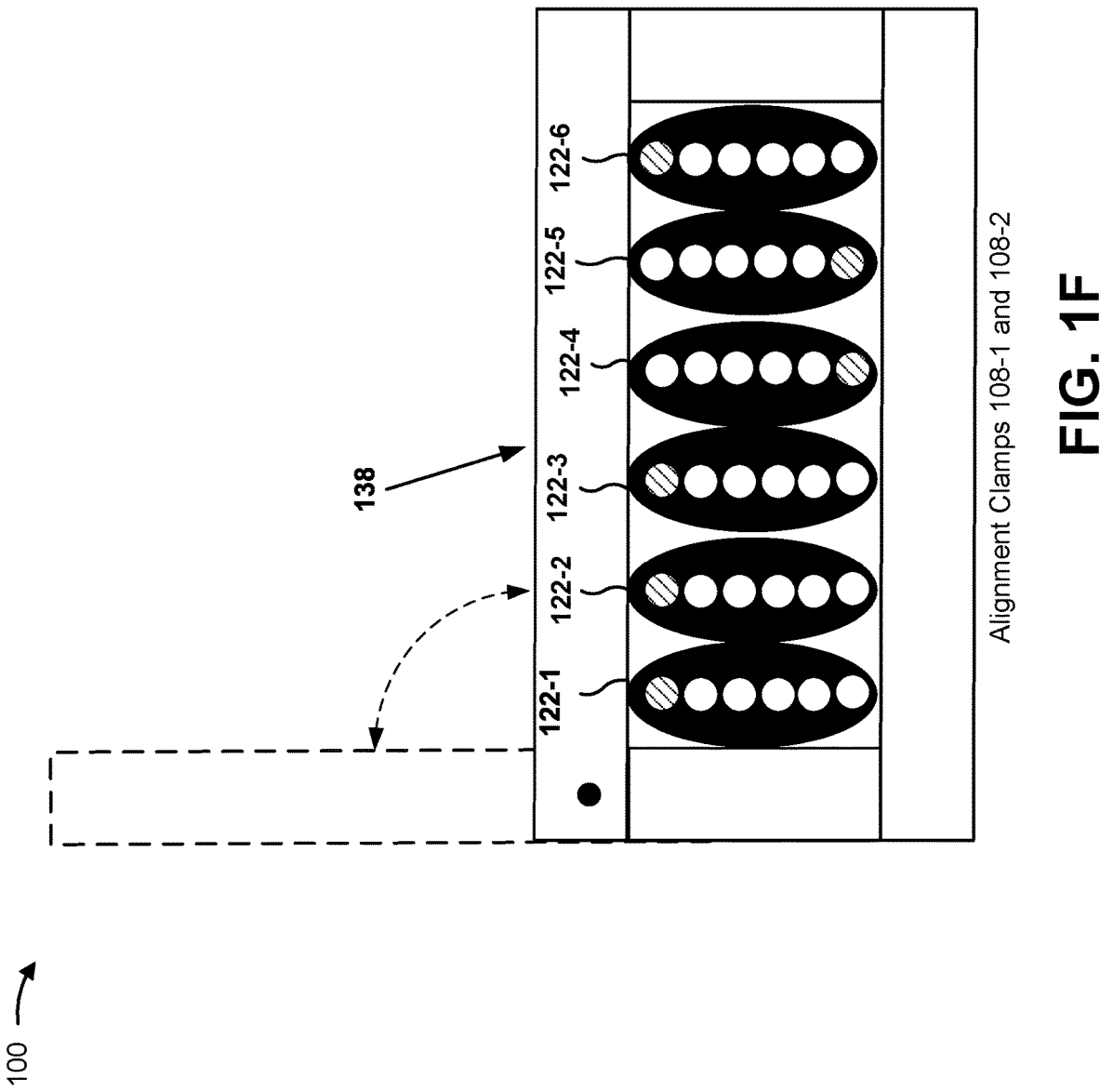

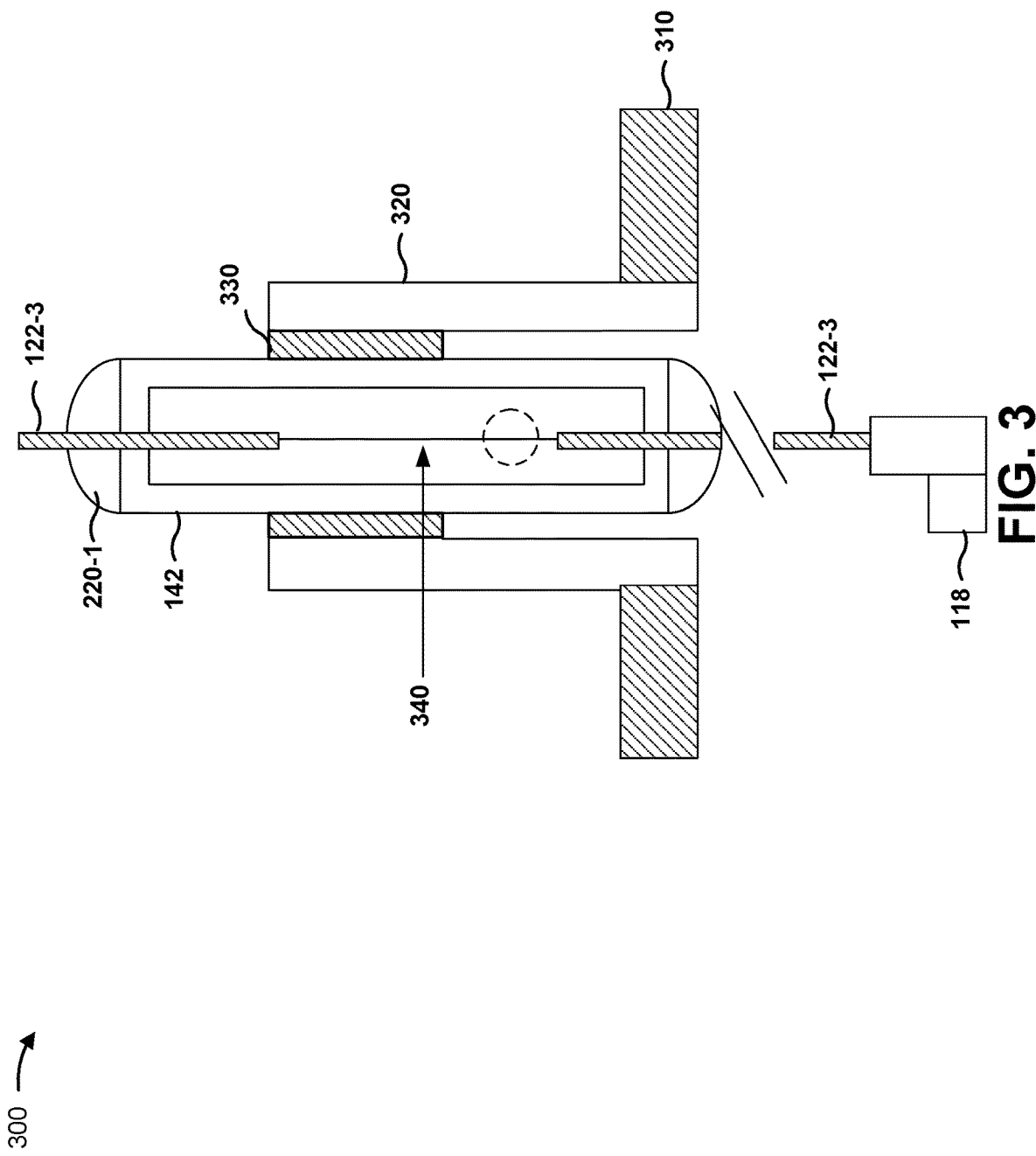

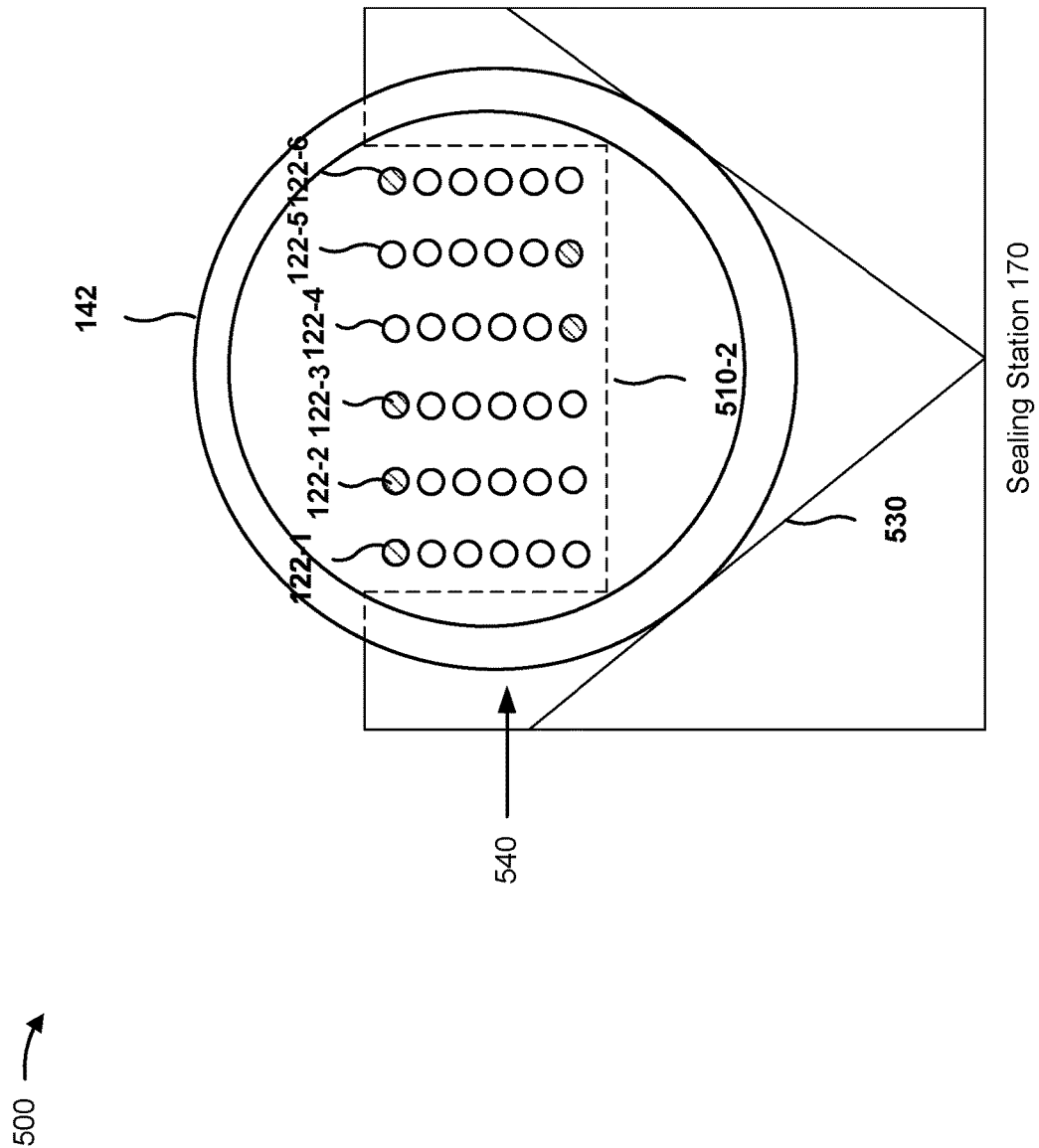

HIGH DENSITY OPTICAL FIBER FEEDTHROUGH

CROSS REFERENCE TO RELATED APPLICATION

This application is a divisional of U.S. patent application Ser. No. 15/820,165, filed on Nov. 21, 2017 (now U.S. Pat. No. 10,481,344), the content of which is hereby incorporated by reference.

TECHNICAL FIELD

The present disclosure relates to optical fiber feedthroughs, more particularly, hermetically sealed optical fiber feedthroughs used in association with a hermetic package.

BACKGROUND

An optical fiber may include a flexible, transparent fiber that is used to transmit light between two ends of the optical fiber. In some cases, optical fibers may be used with components sealed within a hermetic package. For example, one end of the optical fibers may be connected to components within the hermetic package and another end of the optical fibers may be connected to components outside of the hermetic package. An optical fiber feedthrough may be used to permit the optical fibers to pass through a wall of the hermetic package while maintaining the hermetic properties of the hermetic package.

SUMMARY

According to some possible implementations, a method may include aligning a portion of each of a plurality of optical ribbons in a particular orientation or sequence using a set of alignment apparatus. The method may include maintaining, by the set of alignment apparatus, the particular orientation or sequence of the portion of each of the plurality of optical ribbons to prevent misalignment of the portion of each the plurality of optical ribbons as the plurality of optical ribbons is moved from the set of alignment apparatus to one or more other sets of apparatus. The method may include stripping the portion of each of the plurality of optical ribbons to expose a cladding of each fiber of the plurality of optical ribbons. The method may include maintaining, by a set of stripping apparatus, the particular orientation or sequence of the portion of each of the plurality of optical ribbons while the portion of each of the plurality of optical ribbons is being stripped. The method may include removing, by the set of stripping apparatus, slack from the portion of each of the plurality of optical ribbons while the portion of each of the plurality of optical ribbons is being stripped and after the portion of each of the plurality of optical ribbons has been stripped. The method may include hermetically sealing a tube around the portion of each of the plurality of optical ribbons. The method may include maintaining, by a set of sealing apparatus, the particular orientation or sequence of the portion of each of the plurality of optical ribbons while the tube is being hermetically sealed. The method may include removing, by the set of sealing apparatus, slack from the portion of each of the plurality of optical ribbons while the tube is being hermetically sealed.

According to some possible implementations, a system may include a set of alignment devices to align a portion of each of a plurality of optical ribbons in a particular orientation or sequence. The system may include a set of stripping devices to strip the portion of each of the plurality of optical ribbons. The set of stripping devices may maintain the particular orientation or sequence of the portion of each of the plurality of optical ribbons while the portion of each of the plurality of optical ribbons is being stripped and after the portion of each of the plurality of optical ribbons has been stripped. The set of stripping devices may remove slack from the portion of each of the plurality of optical ribbons while the portion of each of the plurality of optical ribbons is being stripped and after the portion of each of the plurality of optical ribbons has been stripped. The system may include a set of sealing devices to hermetically seal the portion of each of the plurality of optical ribbons using a tube. The set of sealing devices may include a set of clamps that can be configured to maintain the particular orientation or sequence of the portion of each of the plurality of optical ribbons while permitting the tube to be moved around the portion of each of the plurality of optical ribbons prior to hermetically sealing the tube around the portion of each of the plurality of optical ribbons. The set of sealing devices may maintain removal of the slack while the tube is being moved around the portion of each of the plurality of optical ribbons and while the portion of each of the plurality of optical ribbons is being hermetically sealed.

According to some possible implementations, a hermetic optical fiber feedthrough may comprise a plurality of optical fibers. At least one optical fiber, of the plurality of optical fibers, may have a cladding diameter that is 125 micrometers or less. Each optical fiber, of the plurality of optical fibers, may have a stripped portion that is hermetically sealed within the hermetic optical fiber feedthrough. The hermetic optical fiber feedthrough may comprise a tube. The tube may be hermetically sealed around the stripped portion of each of the optical fibers. A fiber density within the tube may be at least approximately six fibers per square millimeter.

BRIEF DESCRIPTION OF THE DRAWINGS

FIGS. 1A-1M are diagrams of an overview of an example implementation described herein;

FIG. 3 is a diagram of an example high density optical fiber feedthrough in a context of a hermetic package described herein;

FIGS. 5A and 5B show example groove structures used in association with hermetically sealing a tube to produce a hermetically sealed optical fiber feedthrough.

DETAILED DESCRIPTION

Figure 1A:
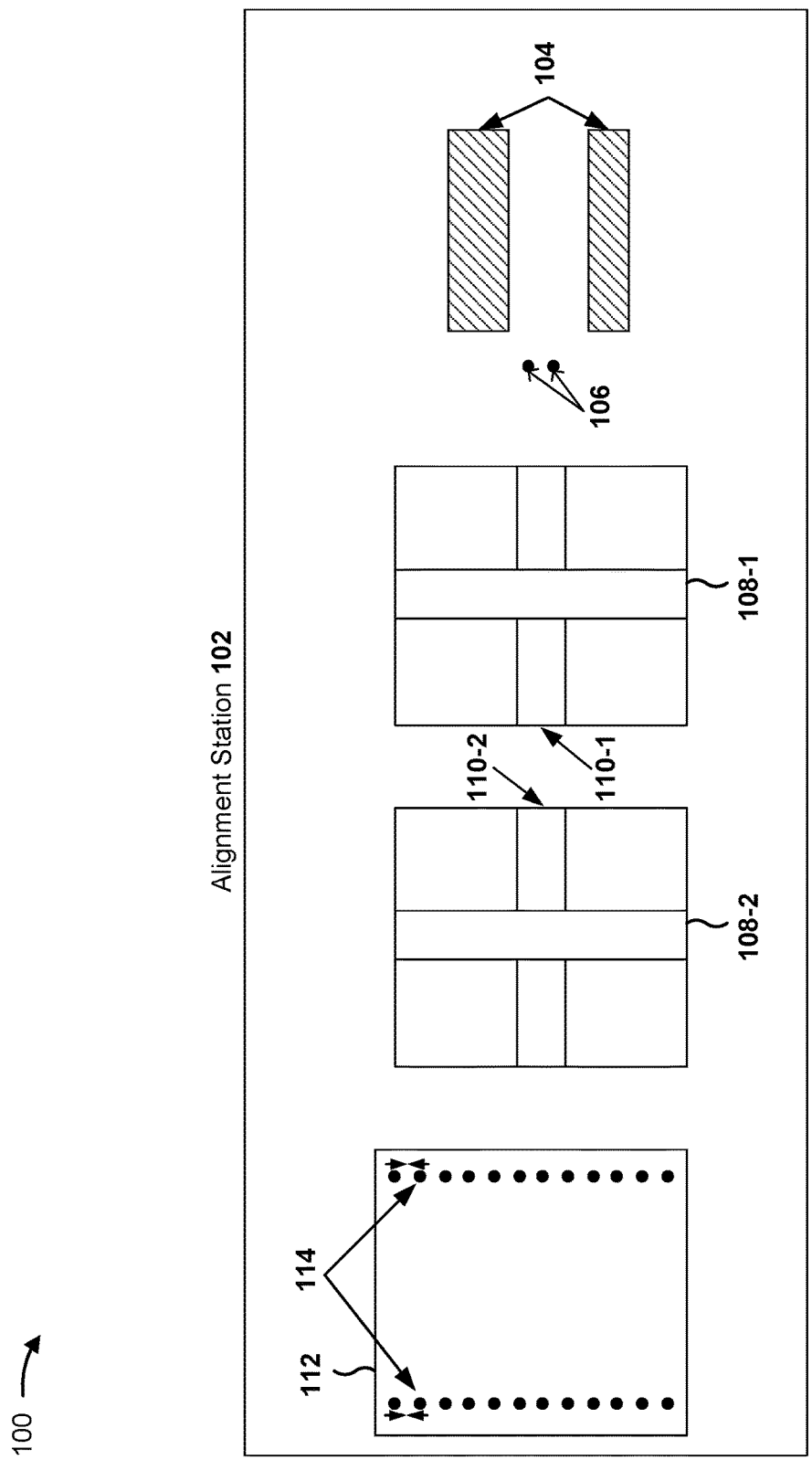

The following detailed description of example implementations refers to the accompanying drawings. The same reference numbers in different drawings may identify the same or similar elements.

An optical fiber feedthrough may be used to permit a set of optical fibers to pass through a wall of a hermetic package while maintaining hermetic properties of the hermetic package. The optical fiber feedthrough may have static dimensions (e.g., a static diameter or a static cross-sectional area). In some cases, an engineer may have a need for a higher density optical fiber feedthrough. For example, the engineer may have a need to pass a higher quantity of optical fibers through the optical fiber feedthrough without increasing the dimensions of the optical fiber feedthrough. This increases a fiber density of the optical fiber feedthrough, thereby increasing a difficulty of manufacturing the optical fiber feedthrough via, for example, an increased likelihood of damage to the optical fibers during manufacturing of the optical fiber feedthrough, an increased likelihood of a failed hermetic seal associated with an optical fiber feedthrough (or a seal with a threshold likelihood of failing), and/or the like.

Some implementations, described herein, provide an optical fiber feedthrough that has a threshold fiber density (e.g., a high density optical fiber feed through). In this way, the optical fiber feedthrough may have a higher fiber density relative to another optical fiber feedthrough. This permits a higher quantity of optical fibers to pass through a wall of a hermetic package relative to another optical fiber feedthrough with a lower fiber density. In addition, this reduces or eliminates a need to use an optical fiber feedthrough with larger dimensions to permit a higher quantity of optical fibers to pass through a wall of a hermetic package. Further, this facilitates higher product functionality (and in turn more optical fibers) of an optical fiber feedthrough, reduced footprint of the optical fiber feedthrough, and/or lower cost for producing the optical fiber feedthrough. Further, increasing the density of optical fibers in the optical fiber feedthrough facilitates a reduction in the quantity of optical fiber feedthroughs needed for a product that includes optical fiber feedthroughs, thereby reducing material costs, assembly costs, and/or product costs for the product.

FIGS. 1A-1M are diagrams of an overview of an example implementation 100 described herein. Implementation 100 relates to manufacturing a high density optical fiber feedthrough. For example, implementation 100 relates to manufacturing an optical fiber feedthrough where optical fibers within the optical fiber feedthrough have a fiber density that satisfies a threshold (e.g., due to a higher quantity of optical fibers being passed through the optical fiber feedthrough, relative to another optical fiber feedthrough with the same dimensions as the optical fiber feedthrough). Implementation 100 includes an alignment station 102, a stripping station 152 (not shown in FIG. 1A), and a sealing station 170 (not shown in FIG. 1A).

FIG. 1A shows a top view of alignment station 102. As shown in FIG. 1A, alignment station 102 may include various components. For example, alignment station 102 may include a clamp 104 to clamp a connector (e.g., a fiber array unit (FAU)) connected to an end of multiple optical ribbons, alignment pins 106 to be used to organize multiple optical ribbons (e.g., into groups, such as pairs, to facilitate alignment into a particular sequence and/or orientation, etc.), alignment clamps 108-1 and 108-2 that are to be used to prevent movement of multiple optical ribbons in alignment grooves 110-1 and 110-2, and/or alignment grooves 110-1 and 110-2 that are to be used, in association with alignment clamps 108-1 and 108-2, to align and/or maintain an alignment of multiple optical ribbons (e.g., to align optical ribbons in a same plane and/or maintain the alignment of the optical ribbons). Additionally, or alternatively, alignment station 102 may include a post-alignment apparatus 112, which includes multiple ribbon clamps 114 (e.g., that clamp in a direction indicated by the black arrows), that is to be used to maintain an alignment of multiple optical ribbons after the multiple optical ribbons are unclamped from alignment clamps 108-1 and 108-2, while the multiple optical ribbons are moved to another station, such as stripping station 152 (FIG. 1I) and/or sealing station 170 (FIG. 1J), to prevent misalignment of the multiple optical ribbons (e.g., a modification to an orientation and/or sequence of the multiple optical ribbons), and/or the like.

In some implementations, alignment station 102 may be used to align multiple optical ribbons in a particular orientation and/or sequence. An orientation of multiple optical ribbons may refer to an orientation of optical fibers of each of the optical ribbons relative to each other, as described in more detail elsewhere herein. A sequence of multiple optical ribbons may refer to a sequence of multiple optical ribbons relative to each other, as described in more detail elsewhere herein. In some implementations, a particular orientation and/or sequence of optical ribbons may refer to a particular orientation and/or sequence of a portion of the optical ribbons (e.g., a stripped portion, a portion to be stripped, etc.).

Figure 1B:
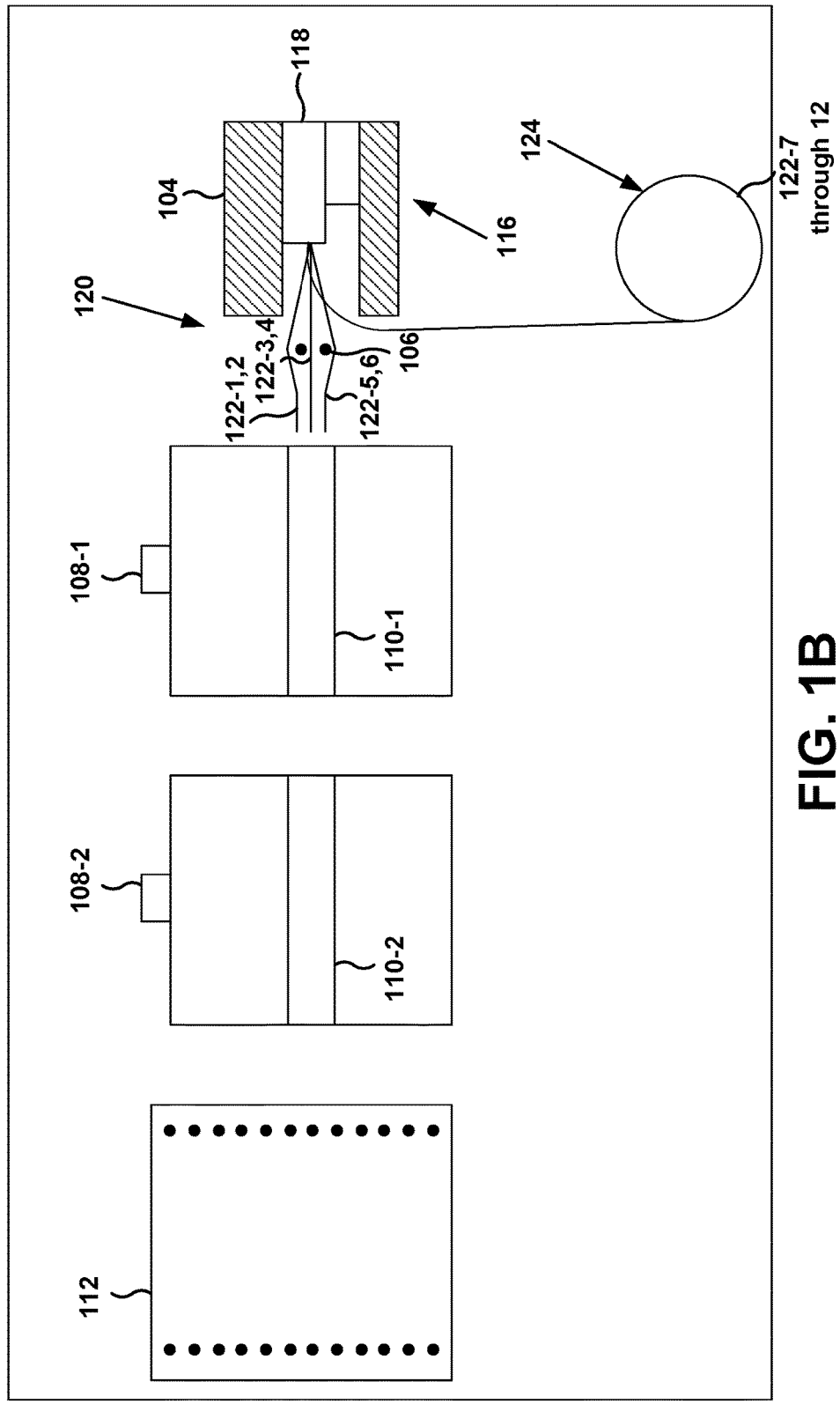

As shown in FIG. 1B, and by reference number 116, a connector 118 associated with multiple optical ribbons may be clamped in clamp 104. As shown by reference number 120, the multiple optical ribbons may be organized around alignment pins 106. Assume, for example, that connector 118 is associated with 12 optical ribbons (e.g., shown as optical ribbons 122-1 through 122-12). Further assume, for example, that the 12 optical ribbons include two groups of six optical ribbons (e.g., 122-1 through 122-6 and 122-7 through 122-12). As further shown by reference number 120, optical ribbons 122-1 and 122-2 may be organized on an outer side of a first alignment pin 106, optical ribbons 122-3 and 122-4 may be organized between the first alignment pin 106 and a second alignment pin 106, and optical ribbons 122-5 and 122-6 may be organized on an outer side of the second alignment pin 106. As shown by reference number 124, optical ribbons 122-7 through 122-12 may be placed away from the components of alignment station 102. Optical ribbons 122-7 through 122-12 will be described in more detail elsewhere herein.

As further shown in FIG. 1B, alignment clamps 108-1 and 108-2 may be in an unclamped position (e.g., open position). This permits optical ribbons 122-1 through 122-6 to be aligned in alignment grooves 110-1 and 110-2. Additionally, or alternatively, this permits optical ribbons 122-1 through 122-6 to be aligned in a same plane when placed in alignment grooves 110-1 and 110-2.

Figure 1C:
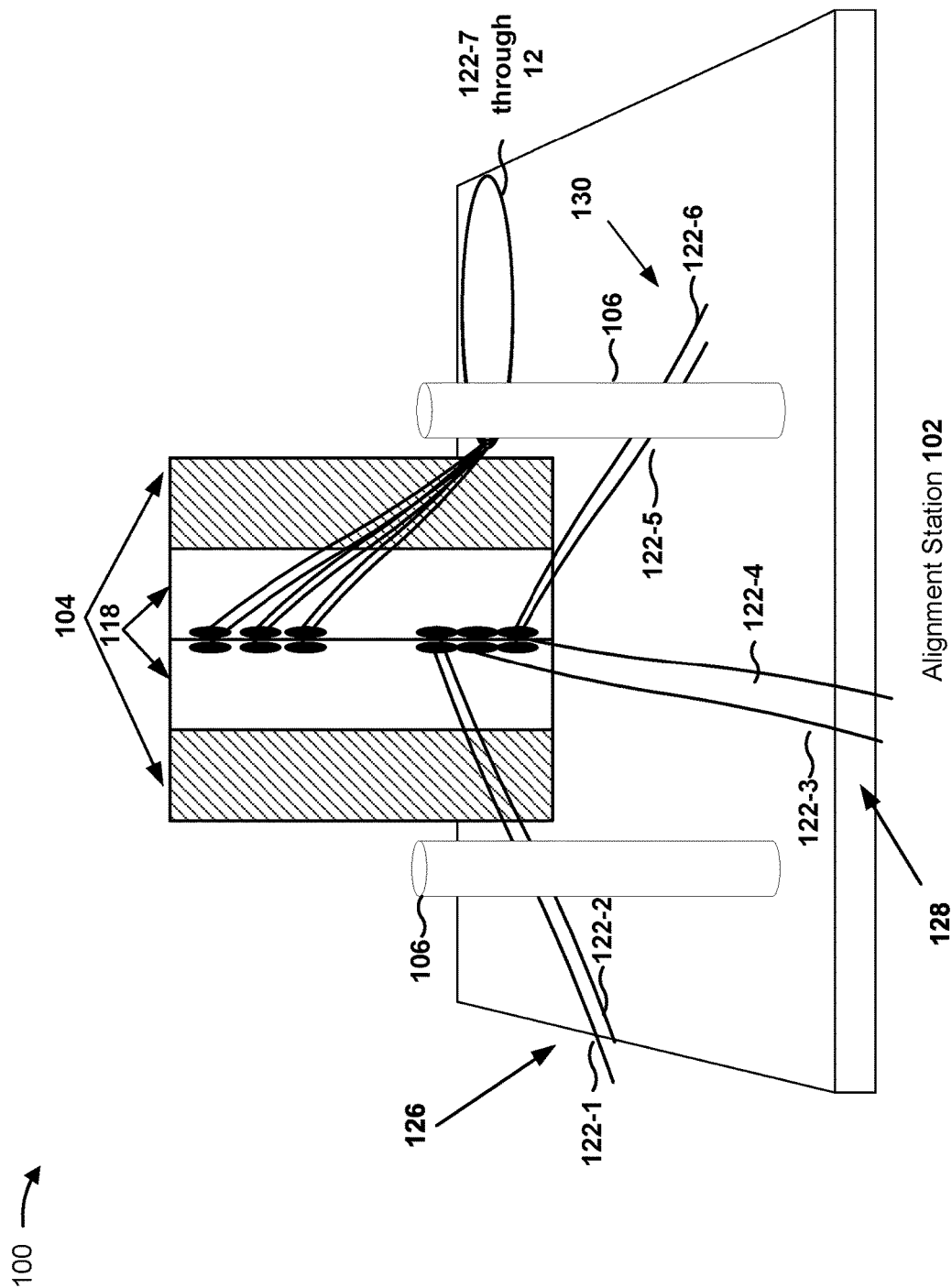

FIG. 1C shows a front view of components of alignment station 102 and of the implementations described with respect to FIG. 1B (e.g., as specifically described with respect to reference number 120). For example, FIG. 1C shows a front view of clamp 104 and alignment pins 106. As further shown in FIG. 1C, optical ribbons 122-1 through 122-6 may be connected to connector 118 in three-by-two matrix (e.g., with three rows and two columns of optical ribbons) and optical ribbons 122-7 through 122-12 may be similarly grouped. Although the configuration shown in FIG. 1C shows a bottom set of optical ribbons 122 (e.g., optical ribbons 122-1 through 122-6) being processed, in some implementations, a top set of optical ribbons 122 (e.g., optical ribbons 122-7 through 122-12), rather than a bottom set of optical ribbons, may be processed (e.g., in the configuration shown in FIG. 1C, optical ribbons 122-7 through 122-12 may be processed rather than optical ribbons 122-1 through 122-6).

As shown by reference number 126, optical ribbons 122-1 and 122-2 may be organized on an outer side of the first alignment pin 106. For example, optical ribbon 122-1 from a first column of optical ribbons associated with connector 118 and optical ribbon 122-2 from a second column of optical ribbons associated with connector 118 may be organized on an outer side of the first alignment pin 106.

As shown by reference number 128, optical ribbons 122-3 and 122-4 may be organized between the first alignment pin 106 and the second alignment pin 106. For example, optical ribbon 122-3 from the first column of optical ribbons associated with connector 118 and optical ribbon 122-4 from the second column of optical ribbons associated with connector 118 may be organized between the first alignment pin 106 and the second alignment pin 106.

As shown by reference number 130, optical ribbons 122-5 and 122-6 may be organized on an outer side of the second alignment pin 106. For example, optical ribbon 122-5 from the first column of optical ribbons associated with connector 118 and optical ribbon 122-6 from the second column of optical ribbons associated with connector 118 may be aligned on an outer side of the second alignment pin 106. Optical ribbons 122-1 through 122-6 may be organized in this manner to permit optical ribbons 122-1 through 122-6 to be aligned in a same plane (e.g., when placed in alignment grooves 110-1 and 110-2), as described in more detail elsewhere herein.

Organizing optical ribbons 122-1 through 122-6 in the manner described with respect to reference numbers 126 through 130 may facilitate alignment of optical ribbons 122-1 through 122-6. For example, optical ribbons 122-1 through 122-6 may be more easily aligned when grouped into pairs. Continuing with the previous example, one or more groupings of a first subset of optical ribbons 122-1 through 122-6 may be maintained while a second subset of optical ribbons 122-1 through 122-6 is aligned in a particular manner.

Although optical ribbons 122-1 through 122-6 are shown and/or described as being organized around particular alignment pins 106, this is merely for example and other examples are possible. For example, the optical ribbons 122 shown by each of reference numbers 126 through 130 may be organized around the first and second alignment pins 106 in a different manner. As a specific example, optical ribbons 122-1 and 122-2 may be organized on an outer side of the second alignment pin 106 and/or between the first alignment pin 106 and the second alignment pin 106 rather than on an outer side of the first alignment pin 106. In this case, optical ribbons 122-3 through 122-6 may be organized around and/or between the first and second alignment pins 106 in a manner different than that shown in FIG. 1C depending on the manner in which optical ribbons 122-1 and 122-2 are organized around and/or between the first and second alignment pins 106.

Figure 1D:
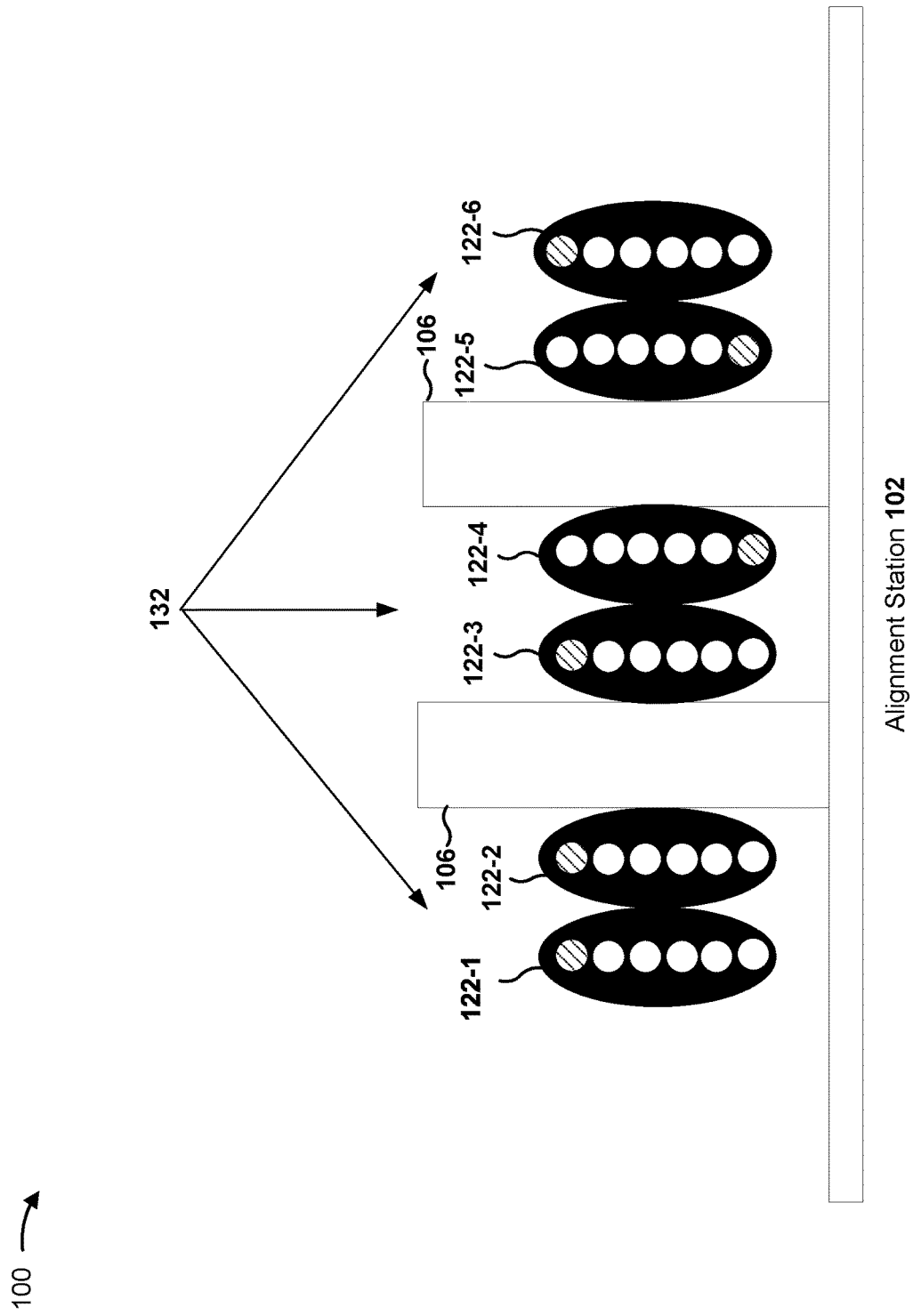

FIG. 1D shows a front view of alignment station 102. For example, FIG. 1D shows a front view of the first and second alignment pins 106. As shown by reference number 132, optical ribbons 122-1 through 122-6 may be organized in a particular sequence after being organized around or between the first and second alignment pins 106 (e.g., as described with respect to FIG. 1C). For example, optical ribbons 122-1 through 122-6 are organized horizontally in a particular sequence. Although FIG. 1C shows optical ribbons being aligned in a same plane (e.g., horizontally), optical ribbons 122-1 through 122-6 may not be organized in a same plane when organized around and/or between alignment pins 106, in some implementations.

FIG. 1D further shows an example of a particular orientation and/or sequence of multiple optical ribbons. The order of optical ribbons 122-1 through 122-6 from left to right or from right to left shows an example of a particular sequence of multiple optical ribbons. If optical ribbons 122-1 through 122-6 were ordered in a different manner, FIG. 1D would show a different sequence for optical ribbons 122-1 through 122-6. As further shown in FIG. 1D, each of optical ribbons 122-1 through 122-6 have one of two different orientations. For example, each of optical ribbons 122-1, 122-2, 122-3, and 122-6 show a first orientation, where a particular optical fiber of each of optical ribbons 122-1, 122-2, 122-3, and 122-6 (show as a white circle with a striped pattern) is oriented at a top of optical ribbons 122-1, 122-2, 122-3, and 122-6. Additionally, or alternatively, and as another example, each of optical ribbons 122-4 and 122-5 show a second orientation, where the particular optical fiber of each of optical ribbons 122-4 and 122-5 is oriented at a bottom of optical ribbons 122-4 and 122-5.

In some implementations, alignment pins 106 may separate groups of optical ribbons 122. Although FIG. 1D shows two alignment pins 106, other implementations may include additional alignment pins 106 or fewer alignment pins 106. In some implementations, the quantity of alignment pins 106 used may be associated with the quantity of groups of optical ribbons 122 needed. For example, as shown in FIG. 1D, three groups of optical ribbons 122 are formed using two alignment pins 106. A single alignment pin 106 would be associated with forming two groups of optical ribbons 122, three alignment pins 106 would be associated with forming four groups of optical ribbons 122, five alignment pins 106 would permit each of optical ribbons 122-1 through 122-6 to be grouped individually, and so forth.

In some implementations, and as further shown in FIG. 1D, optical ribbons 122-1 through 122-6 (and optical ribbons 122-7 through 122-12 although not shown in FIG. 1D) may be the same color (e.g., shown as black ovals) or have the same markings. This reduces costs associated with using optical ribbons 122 in production of an optical fiber feed-through by reducing or eliminating a need for multiple colors of optical ribbons 122 so that the optical ribbons 122 can be distinguished from each other. In some implementations, maintaining an orientation and/or sequence of optical ribbons 122-1 through 122-7, as described herein, may facilitate use of optical ribbons 122 with a uniform appearance (e.g., uniformly colored optical ribbons 122, optical ribbons 122 with the same markings, etc.).

Figure 1E:
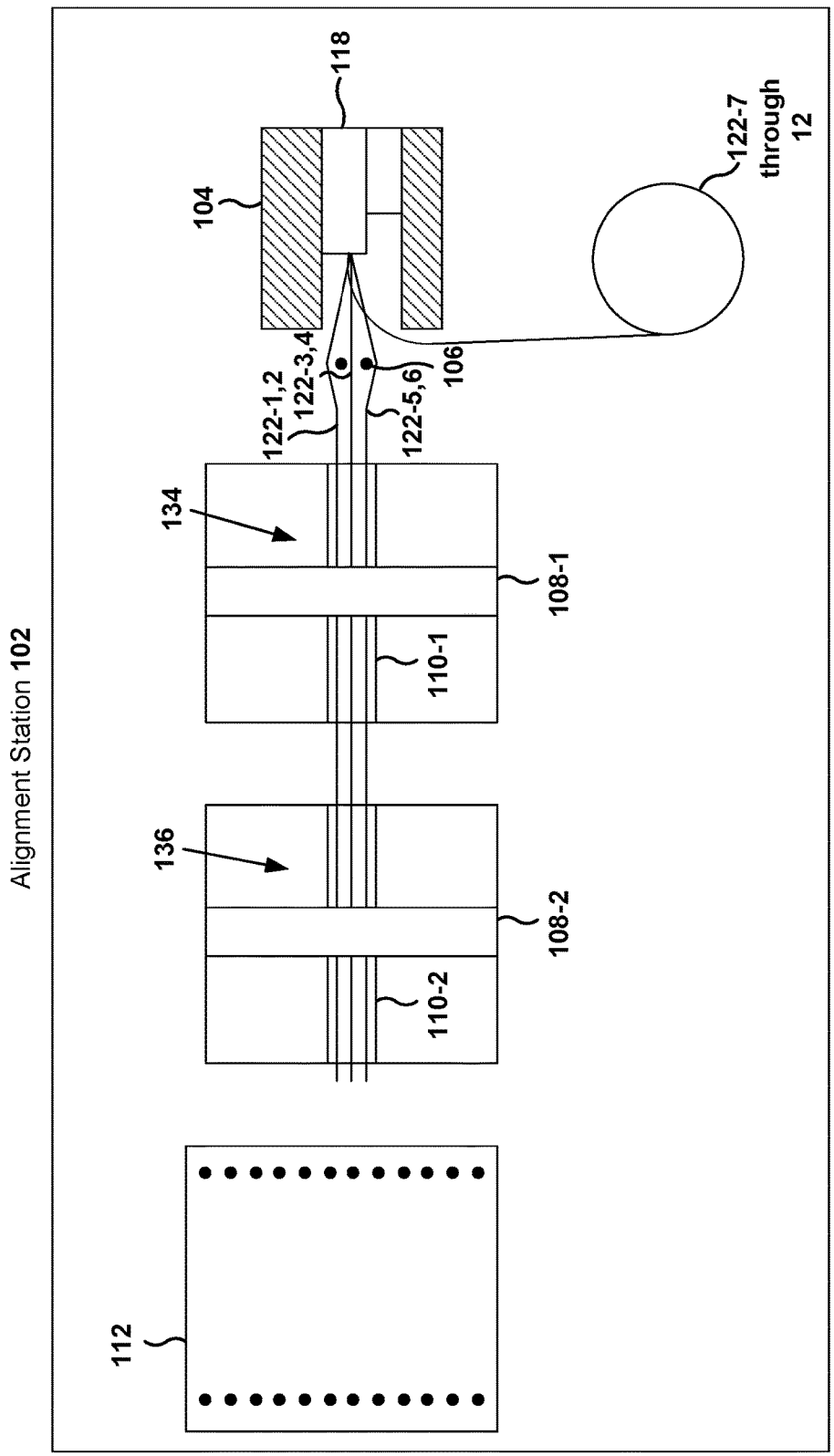

FIG. 1E shows a top view of alignment station 102, similar to that shown in FIGS. 1A and 1B. As shown by reference number 134, optical ribbons 122-1 through 122-6 may be placed into alignment groove 110-1. In some implementations, the orientation and/or sequence of optical ribbons 122-1 through 122-6 may be maintained while optical ribbons 122-1 through 122-6 are placed into alignment groove 110-1 and alignment groove 110-1 may maintain the alignment of optical ribbons 122-1 through 122-6. As further shown by reference number 134, optical ribbons 122-1 through 122-6 may be clamped into alignment groove 110-1 using alignment clamp 108-1. Alignment groove 110-1 and alignment clamp 108-1 may prevent misalignment of optical ribbons 122-1 through 122-6. For example, alignment groove 110-1 and alignment clamp 108-1 may prevent a modification to the orientation and/or sequence of optical ribbons 122-1 through 122-6 that could occur from optical ribbons 122-1 through 122-6 being permitted to move freely, being permitted to twist, and/or the like. Additionally, or alternatively, alignment groove 110-1 may be used to align a portion of optical ribbons 122-1 through 122-6 in a same plane (e.g., side-by-side, without any of optical ribbons 122-1 through 122-6 being aligned higher or lower relative to another of optical ribbons 122-1 through 122-6, etc.).

As shown by reference number 136, optical ribbons 122-1 through 122-6 may be placed into alignment groove 110-2 and clamped by alignment clamp 108-2. For example, optical ribbons 122-1 through 122-6 may be placed into alignment groove 110-2 and clamped by alignment clamp 108-2 in a manner similar to that described with respect to reference number 134. In some implementations, alignment clamps 108-1 and 108-2 and/or alignment grooves 110-1 and 110-2 may be used to align a portion of optical ribbons 122-1 through 122-6 (e.g., a portion to be stripped) and/or may maintain an alignment of optical ribbons 122-1 through 122-6. For example, alignment clamps 108-1 and 108-2 and/or alignment grooves 110-1 and 110-2 may be used to align the portion of optical ribbons 122-1 through 122-6 between alignment clamps 108-1 and 108-2 and/or alignment grooves 110-1 and 110-2. Additionally, or alternatively, alignment groove 110-2 may be used to align a portion of optical ribbons 122-1 through 122-6 in a same plane. In some implementations, aligning optical ribbons 122-1 through 122-6 in a same plane using alignment grooves 110-1 and 110-2 may result in alignment, in a same plane, of a portion of optical ribbons 122-1 through 122-6 to be stripped (e.g., the portion of optical ribbons 122-1 through 122-6 between alignment grooves 110-1 and 110-1 and/or alignment clamps 108-1 and 108-2.

FIG. 1F shows a front view of alignment clamps 108-1 and 108-2. As shown by reference number 138, optical ribbons 122-1 through 122-6 may be in alignment grooves 110-1 and 110-2. As further shown by reference number 138, the orientation and/or sequence of optical ribbons 122-1 through 122-6 was maintained as optical ribbons 122-1 through 122-6 were placed in alignment grooves 110-1 and 110-2 and were clamped by alignment clamps 108-1 and 108-2. As further shown by reference number 138, when clamped, alignment clamps 108-1 and 108-2 may prevent misalignment of optical ribbons 122-1 through 122-6, particularly while post-alignment apparatus 112 is being connected to an end of optical ribbons 122-1 through 122-6, while a tube is being placed around optical ribbons 122-1 through 122-6 (e.g., is being moved onto optical ribbons 122-1 through 122-6), and/or the like, as described in more detail elsewhere herein.

Figure 1G:
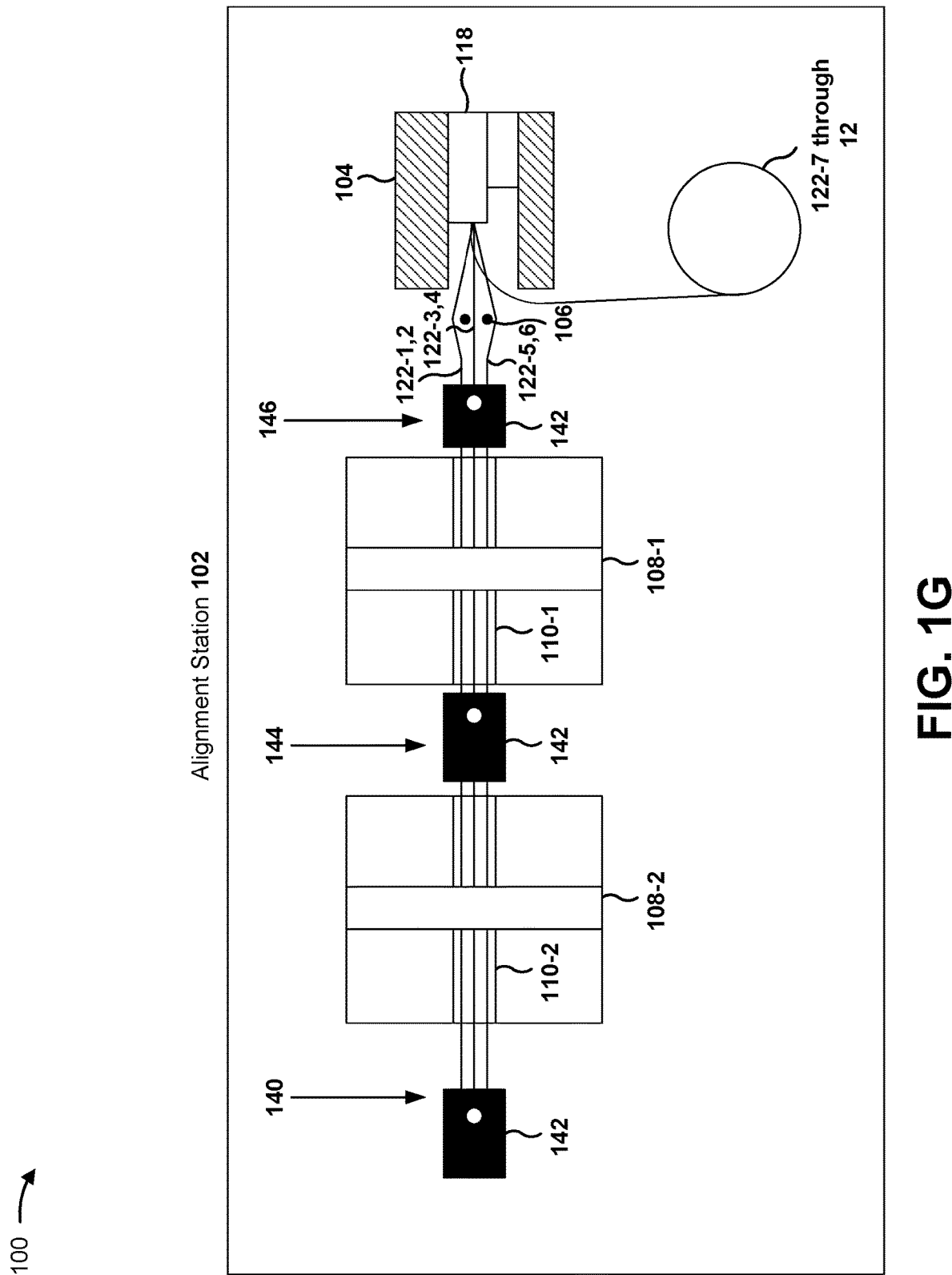

FIG. 1G shows implementations related to placing a tube around optical ribbons 122-1 through 122-6. For example, the tube may be used to produce an optical fiber feedthrough by hermetically sealing the tube around a portion of optical ribbons 122-1 through 122-6, as described in more detail elsewhere herein. Hermeticity, as used herein, may be defined as a helium leak rate. For example, the helium leak rate for an optical fiber feed through produced via the implementations described herein may be $10^{-8}$ cubic centimeters (cc) per atmosphere per second. The hermeticity of an optical fiber feed through may be tested in line with military standard 883 (MIL-STD-883), method 1014.13. As shown by reference number 140, tube 142 may be placed around optical ribbons 122-1 through 122-6 at an end of optical ribbons 122-1 through 122-6. For example, and as further shown in FIG. 1G, tube 142 may be placed around optical ribbons 122-1 through 122-6 at an opposite end of optical ribbons 122-1 through 122-6 from connector 118. In some implementations, if optical ribbons 122-1 through 122-6 are not connected to connector 118, tube 142 may be placed around optical ribbons 122-1 through 122-2 at either end of optical ribbons 122-1 through 122-2.

As shown by reference number 144, tube 142 may be positioned between alignment clamps 108-1 and 108-2 (e.g., moved from the position shown by reference number 140 to the position shown by reference number 144). For example, tube 142 may be moved over alignment groove 110-2 and past unclamped alignment clamp 108-2, such that tube 142 is between alignment clamps 108-1 and 108-2.

In some implementations, because alignment station 102 includes multiple alignment clamps 108 and multiple alignment grooves 110, the particular orientation and/or sequence of optical ribbons 122-1 through 122-6 may be maintained while tube 142 is moved between alignment clamps 108-1 and 108-2 (e.g., to the position shown by reference number 144). For example, alignment clamp 108-1 may remain clamped while alignment clamp 108-2 is unclamped to permit tube 142 to be moved past clamp 108-2. This maintains the orientation and/or sequence of optical ribbons 122-1 through 122-6.

In some implementations, a portion of optical ribbons 122-1 through 122-6 that needs to be aligned may correspond approximately to the position of tube 142 shown by reference number 144. For example, the portion of optical ribbons 122-1 through 122-6 may correspond to a portion of optical ribbons 122-1 through 122-6 to be stripped.

As shown by reference number 146, tube 142 may be positioned between alignment clamp 108-1 and alignment pins 106 (e.g., moved from the position shown by reference number 144 to the position shown by reference number 146). In some implementations, tube 142 may be positioned between alignment clamp 108-1 and alignment pins 106 in a manner similar to that described with respect to reference number 144. For example, alignment clamp 108-1 may be unclamped (while alignment clamp 108-2 remains clamped) and tube 142 may be moved past alignment clamp 108-1 and alignment groove 110-1 to the position shown by reference number 146. This maintains an orientation and/or sequence of optical ribbons 122-1 through 122-6 while tube 142 is moved to the position shown by reference number 146.

Figure 1H:
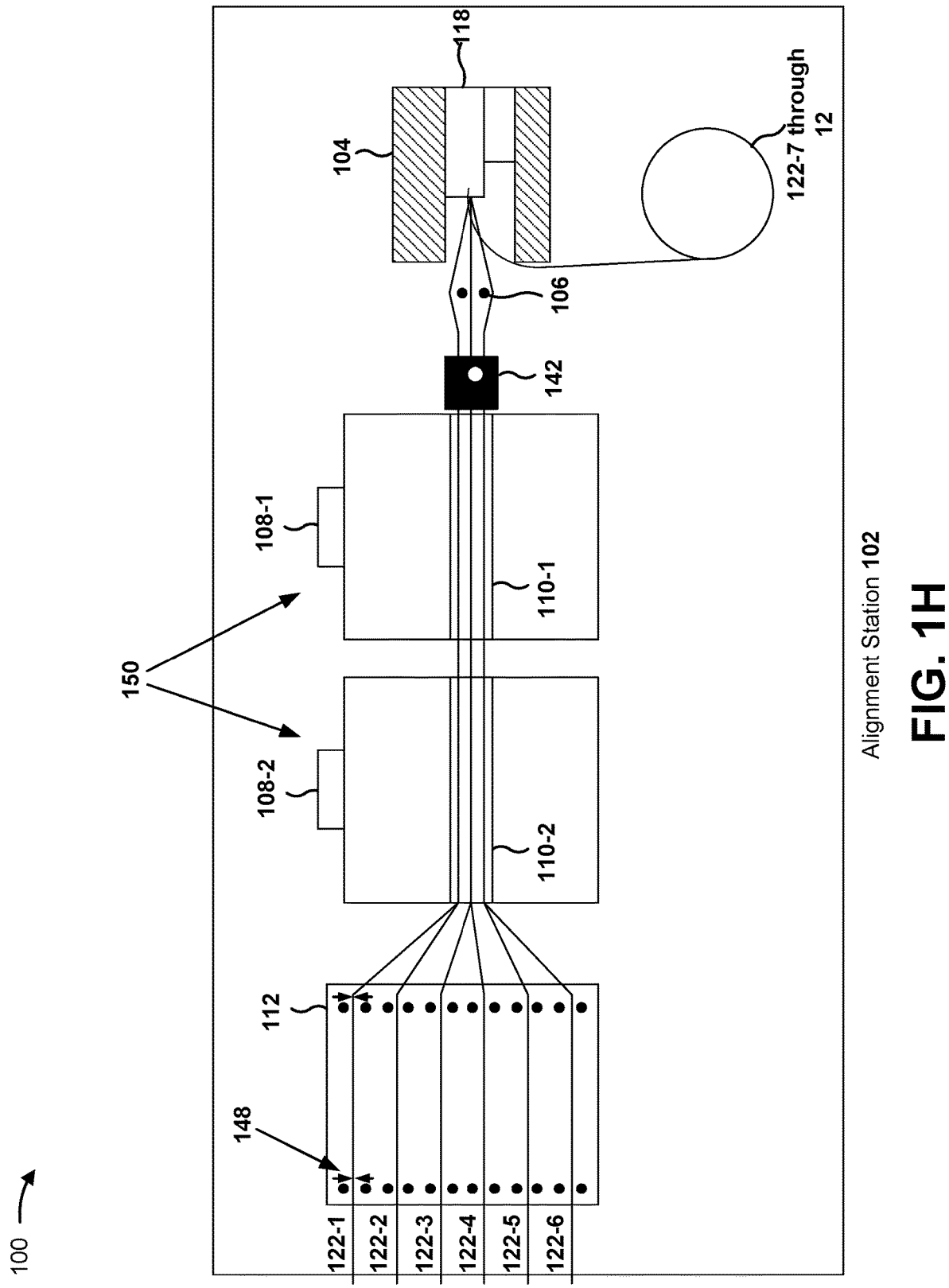

As shown in FIG. 1H, and by reference number 148, the ends of optical ribbons 122-1 through 122-6 may be connected to post-alignment apparatus 112 (e.g., clamped to post-alignment apparatus 112). For example, the ends of optical ribbons 122-1 through 122-6 may be clamped using ribbon clamps 114 (reference number not shown in FIG. 1H). In some implementations, by clamping the ends of optical ribbons 122-1 through 122-6 to post-alignment apparatus 112, an orientation and/or sequence of optical ribbons 122-1 through 122-6 may be maintained when alignment clamps 108-1 and 108-2 are unclamped. Additionally, or alternatively, post-alignment apparatus 112 may permit optical ribbons 122-1 through 122-6 to be moved to another station (e.g., stripping station 152 and/or sealing station 170), while maintaining the orientation and/or sequence of optical ribbons 122-1 through 122-6.

As shown by reference number 150, alignment clamps 108-1 and 108-2 may be unclamped. For example, alignment clamps 108-1 and 108-2 may be unclamped after post-alignment apparatus 112 has been connected to the ends of optical ribbons 122-1 through 122-6. In some implementations, optical ribbons 122-1 through 122-6 may be moved to stripping station 152 for stripping after alignment clamps 108-1 and 108-2 have been unclamped (e.g., where optical ribbons 122-7 through 122-12 are additionally moved to stripping station 152 but are placed aside from optical ribbons 122-1 through 122-6).

Figure 1I:
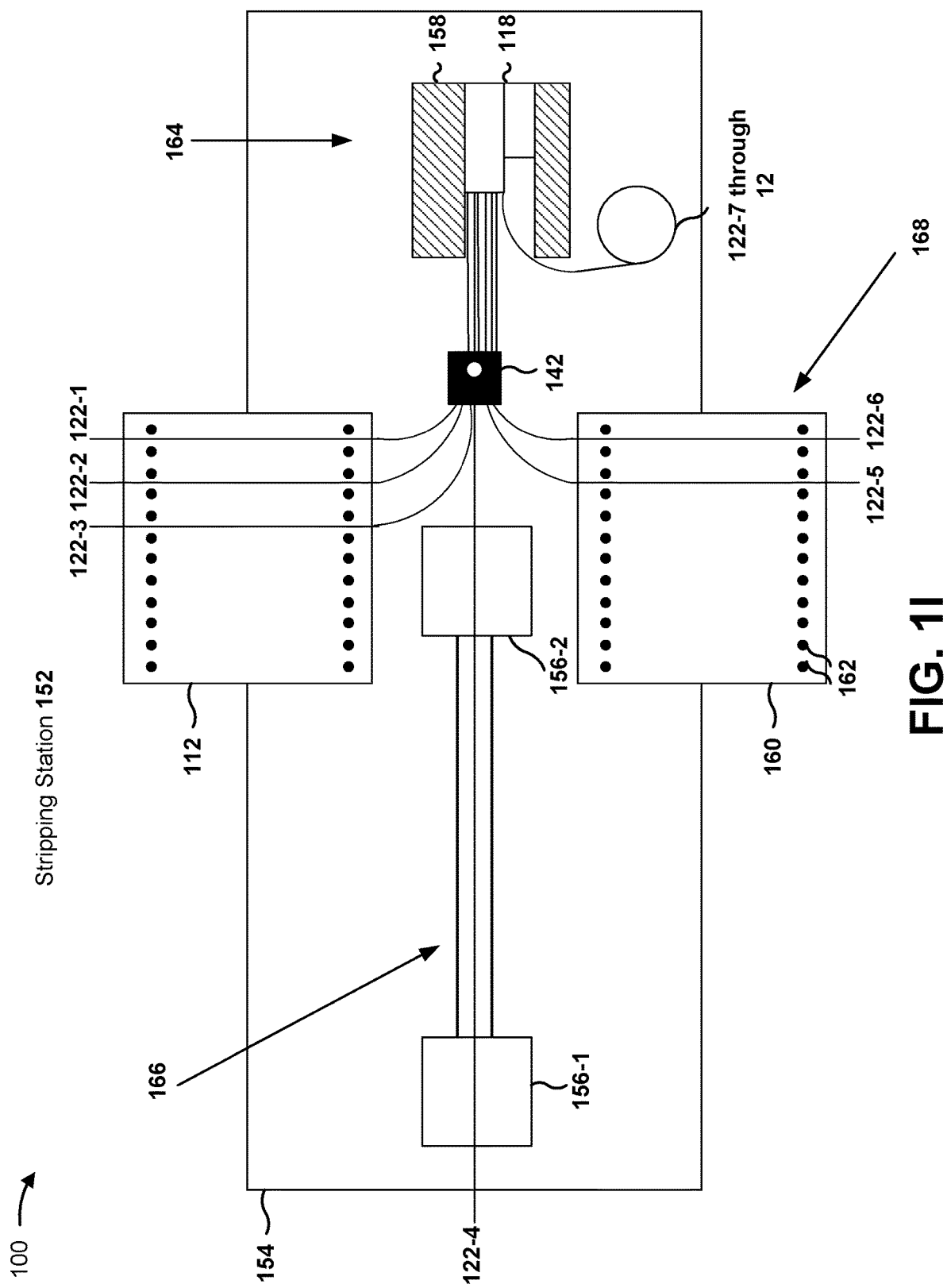

FIG. 1I shows a top view of stripping station 152. In some implementations, stripping station 152 may include a set of components capable of stripping a portion of optical ribbons 122-1 through 122-6 (e.g., to expose a cladding of each optical fiber of each of optical ribbons 122-1 through 122-6).

As further shown in FIG. 1I, stripping station 152 may include a stripper 154 (e.g., a hot air stripper) to strip a portion of optical ribbons 122-1 through 122-6, stripping clamps 156-1 and 156-2 to prevent movement of a portion of an optical ribbon while the portion of the optical ribbon is being stripped (e.g., maintain an orientation and/or sequence of the portion of the optical ribbon), a stripper connector clamp 158 to prevent movement of connector 118 during stripping, and/or a post-stripping apparatus 160 to prevent movement of the portion of optical ribbons 122-1 through 122-6 after a portion of optical ribbons 122-1 through 122-6 has been stripped. As shown by reference number 162, post-stripping apparatus 160 may include multiple post-stripping ribbon clamps, similar to ribbon clamps 114, to prevent movement of a portion of optical ribbons 122-1 through 122-6 after the portion of optical ribbons 122-1 through 122-6 has been stripped.

In some implementations, post-stripping apparatus 160 may maintain an orientation and/or sequence of a portion of optical ribbons 122-1 through 122-6 after the portion of optical ribbons 122-1 through 122-6 has been stripped. Additionally, or alternatively, post-stripping apparatus 160 may permit optical ribbons 122-1 through 122-6 to be moved to sealing station 170, while maintaining the orientation and/or sequence of optical ribbons 122-1 through 122-6. Additionally, or alternatively, post-stripping apparatus 160 may remove and/or maintain removal of slack from a stripped portion of optical ribbons 122-1 through 122-6, thereby preventing the stripped portions from contacting each other (e.g., preventing stripped portions of optical ribbons 122 from contacting each other and/or preventing stripped portions of optical fibers of each optical ribbon 122 from contacting each other) or other components of stripping station 152. This reduces a likelihood of damage that could occur to optical ribbons 122-1 through 122-6 after a portion of optical ribbons 122-1 through 122-6 has been stripped.

As further shown in FIG. 1I, stripping station 152 may include post-alignment apparatus 112. In some implementations, post-alignment apparatus 112 may prevent movement of optical ribbons 122-1 through 122-3 prior to a portion of optical ribbons 122-1 through 122-3 being stripped. For example, as further shown in FIG. 1I, post-alignment apparatus 112 may maintain an orientation and/or sequence of optical ribbons 122-1 through 122-3 prior to optical ribbons 122-1 through 122-3 being stripped, may remove and/or maintain removal of slack from a portion of optical ribbons 122-1 through 122-3, and/or the like.

As shown by reference number 164, stripper connector clamp 158 may clamp connector 118 to prevent movement of connector 118. For example, stripper connector clamp 158 may prevent movement of connector 118 while optical ribbons 122-1 through 122-6 are being stripped. As shown by reference number 166, stripping clamps 156-1 and 156-2 may be clamping optical ribbon 122-4 to permit stripper 154 to strip a portion of optical ribbon 122-4. In some implementations, stripping clamps 156-1 and 156-2 may apply tension to a portion of optical ribbon 122-4 while the portion is being stripped.

As shown by reference number 168, post-stripping apparatus 160 may be securing optical ribbons 122-5 and 122-6 after a portion of optical ribbons 122-5 and 122-6 has been stripped. In some implementations, post-stripping apparatus 160 may prevent movement of optical ribbons 122-5 and 122-6, or any other of optical ribbons 122-1 through 122-4 post stripping, in a manner that maintains an orientation and/or sequence of optical ribbons 122-5 and 122-6, or any other of optical ribbons 122-1 through 122-4.

In some implementations, optical ribbons 122-1 through 122-6 may be stripped in a sequential manner (e.g., where optical ribbons 122-1 through 122-6 are stripped sequentially starting with optical ribbon 122-6, proceeding to optical ribbon 122-5, and so forth). For example, optical ribbons 122-1 through 122-6 may be stripped in a one-at-a-time manner. Additionally, or alternatively, optical ribbons 122-1 through 122-6 may be stripped in a manner that maintains a sequence of optical ribbons 122-1 through 122-6, that matches the sequence of optical ribbons 122-1 through 122-6, and/or the like.

Figure 1J:
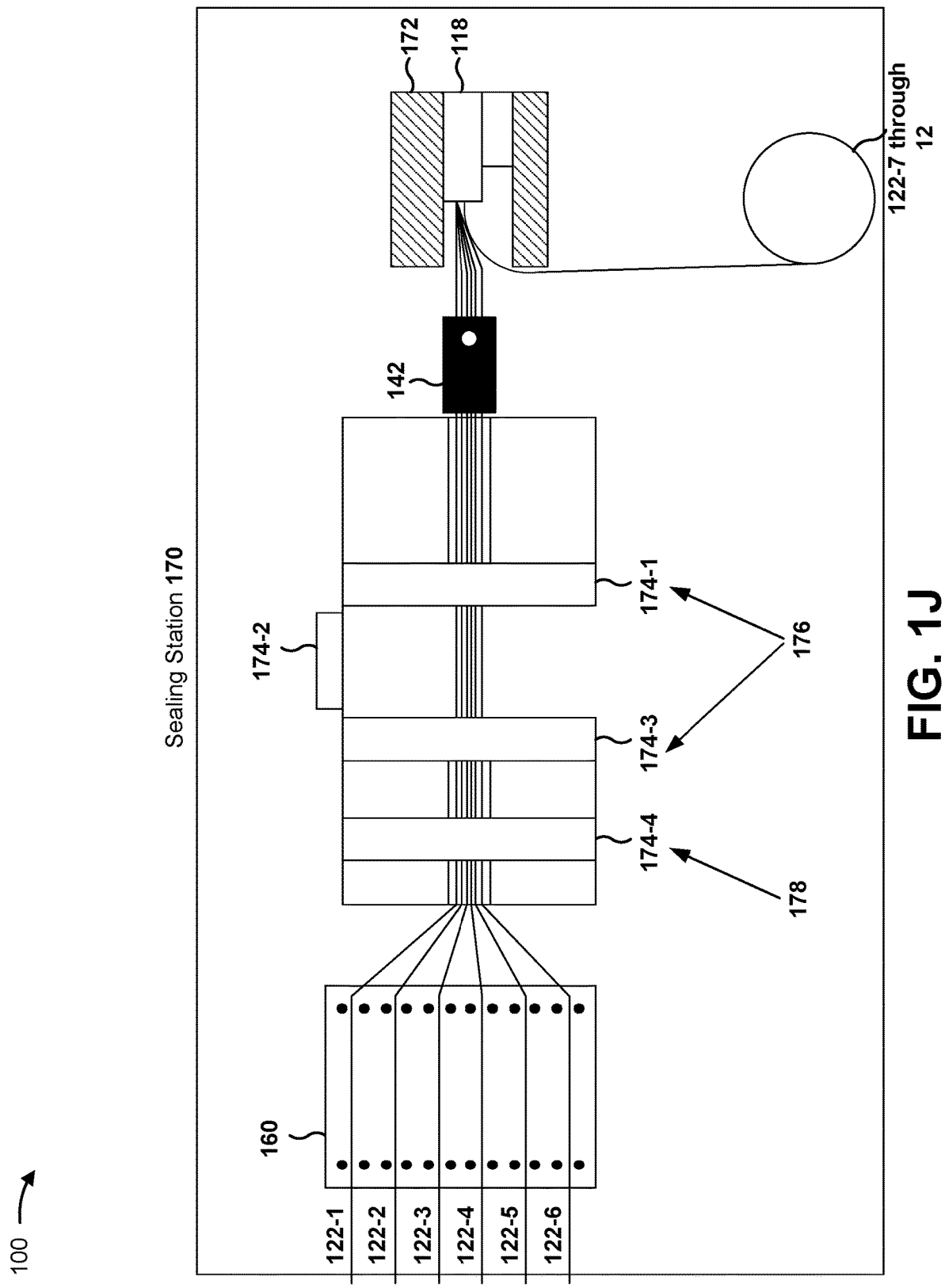

FIG. 1J shows a top view of a sealing station 170. As shown in FIG. 1J, sealing station 170 may include a set of components related to hermetically sealing tube 142 around a portion of optical ribbons 122-1 through 122-6 (e.g., around a stripped portion of optical ribbons 122-1 through 122-6). For example, sealing station 170 may include a sealing connector clamp 172 to clamp connector 118 to prevent movement of connector 118 during sealing of tube 142. Additionally, or alternatively, and as another example, sealing station 170 may include sealing clamps 174-1, 174-3, and 174-4 to prevent movement of optical ribbons 122-1 through 122-6 during sealing of tube 142 and sealing clamp 172-2 to prevent movement of tube 142 during sealing of tube 142. In some implementations, sealing clamps 174-1 through 174-4 may maintain an orientation and/or sequence of optical ribbons 122-1 through 122-6 during sealing of tube 142.

In some implementations, optical ribbons 122-1 through 122-6 may be placed within various groove structures associated with sealing station 170, as described in more detail elsewhere herein. In some implementations, an orientation and/or sequence of optical ribbons 122-1 through 122-6 may be maintained while optical ribbons 122-1 through 122-6 are placed into the various groove structures. In some implementations, the groove structures may maintain an orientation and/or sequence of optical ribbons 122-1 through 122-6 (e.g., during sealing of tube 142), modify a proximity of a portion of optical ribbons 122-1 through 122-6 (e.g., to permit tube 142 to fit around the portion), and/or the like.

As shown by reference number 176, sealing clamps 174-1 and 174-3 may be clamped to prevent movement of optical ribbons 122-1 through 122-6 (e.g., to maintain an orientation and/or sequence of optical ribbons 122-1 through 122-6). As shown by reference number 178, sealing clamp 174-4 may be clamped over optical ribbons 122-1 through 122-6. In some implementations, when clamped, sealing clamp 174-4 may maintain an orientation and/or sequence of optical ribbons 122-1 through 122-6 while sealing clamps 174-1 and 174-3 are unclamped, as described in more detail elsewhere herein.

Figure 1K:
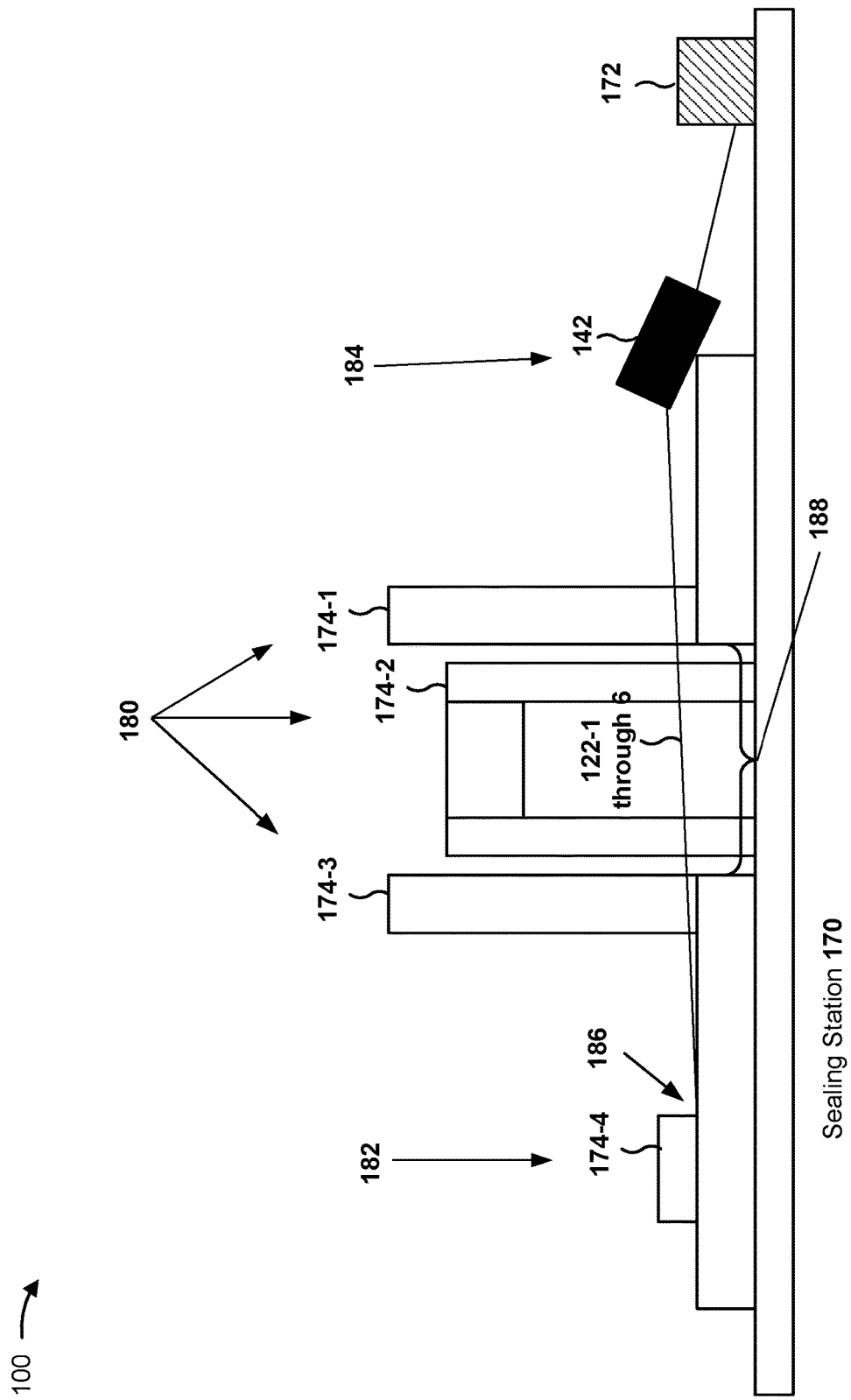

FIG. 1K shows a side view of sealing station 170. As shown by reference number 180, sealing clamps 174-1 through 174-3 may be unclamped. For example, sealing clamps 174-1 through 174-3 may be unclamped to permit tube 142 to be moved around a particular portion of optical ribbons 122-1 through 122-6, such as a stripped portion (e.g., by permitting a portion of optical ribbons 122-1 through 122-6 to rise out of a groove associated with sealing station 170 as tube 142 is moved past clamp 174-1).

As shown by reference number 182, sealing clamp 174-4 may remain clamped while tube 142 is positioned around a portion of optical ribbons 122-1 through 122-6. This maintains an orientation and/or sequence of optical ribbons 122-1 through 122-6 as a portion of optical ribbons 122-1 through 122-6 rise out of the groove associated with sealing station 170 as tube 142 is moved over sealing clamp 174-1 (e.g., by clamping a portion of optical ribbons 122-1 through 122-6 in the groove). As shown by reference number 184, tube 142 may be moved over sealing clamp 174-1. In some implementations, an edge of sealing clamp 174-4 (e.g., an edge closest to tube 142, as shown by reference number 186) may be rounded. This may increase a capability of a portion of optical ribbons 122-1 through 122-6 to rise out of a groove while reducing a likelihood of damage to optical ribbons 122-1 through 122-6 that could occur from optical ribbons 122-1 through 122-6 rising out of the groove and contacting the edge of sealing clamp 174-4.

As shown by reference number 188, tube 142 may be moved between sealing clamps 174-1 and 174-3. In some implementations, tube 142 may be positioned around a stripped portion of optical ribbons 122-1 through 122-6, in a groove between sealing clamps 174-1 and 174-3, under a component to be used to fill tube 142 with solder via an injection hole of tube 142, and/or the like. In some implementations, a proximity of a portion of optical ribbons 122-1 through 122-6 may be modified such that the tube 142 can fit around the portion. In some implementations, the proximity of the portion of optical ribbons 122-1 through 122-6 may be modified such that a distance between the portion and a wall of tube 142 satisfies a threshold, such that a distance between the portion of each of optical ribbons 122-1 through 122-6 satisfies a threshold, such that the portion of optical ribbons 122-1 through 122-6 are not contacting each other, and/or the like, thereby reducing or eliminating damage to optical ribbons 122-1 through 122-6, reducing or eliminating errors that could occur when a signal is passed through optical ribbons 122-1 through 122-6, and/or increasing a likelihood of achieving a hermetic seal.

Figure 1L:
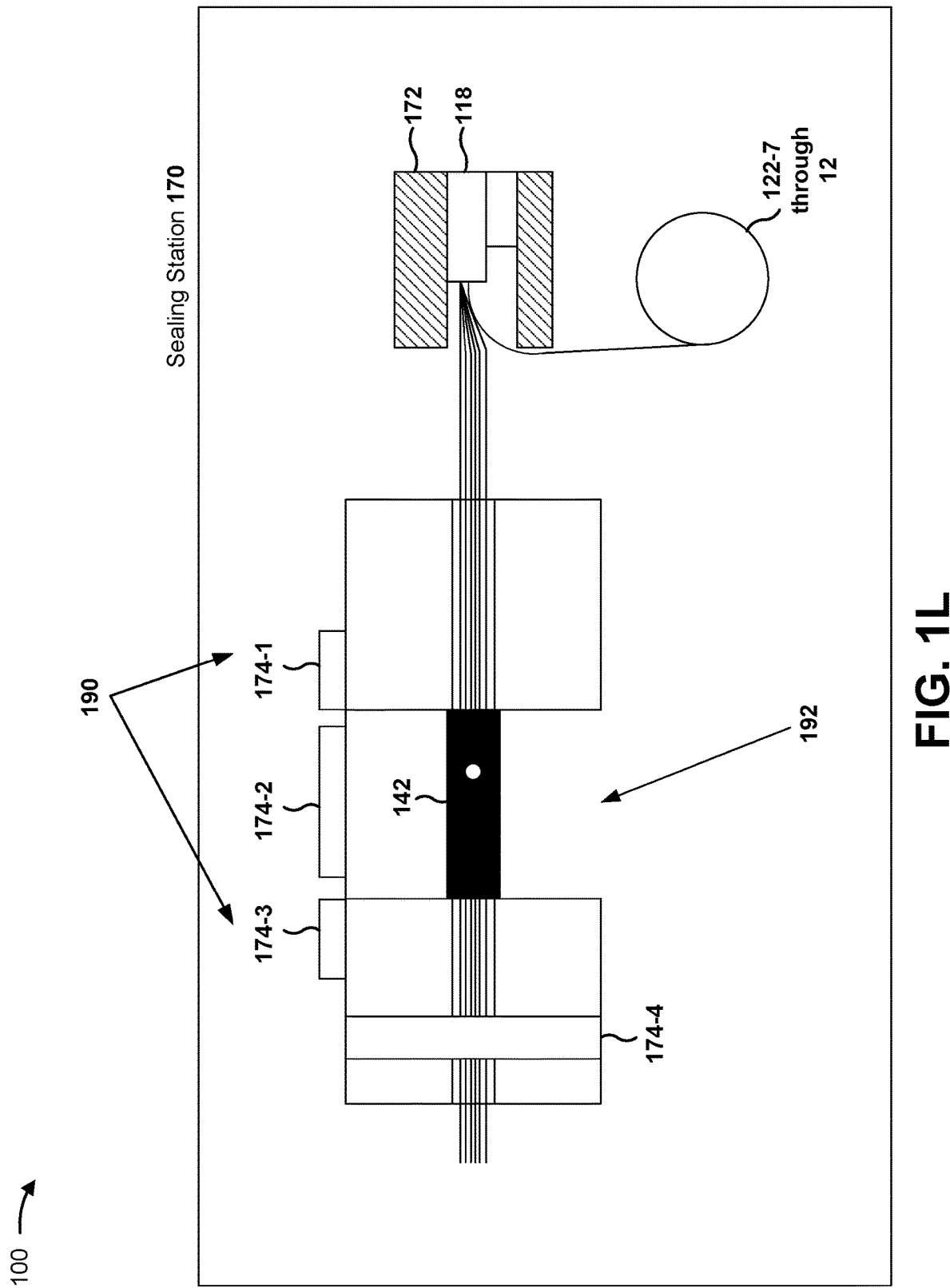

FIG. 1L shows a top view of sealing station 170. As shown by reference number 190, sealing clamps 174-1 and 174-3 may remain unclamped as tube 142 is positioned between sealing clamps 174-1 and 174-3 and/or around a stripped portion of optical ribbons 122-1 through 122-6. As shown by reference number 192, tube 142 may be positioned between sealing clamps 174-1 and 174-3 and/or or around a stripped portion of optical ribbons 122-1 through 122-6.

Figure 1M:
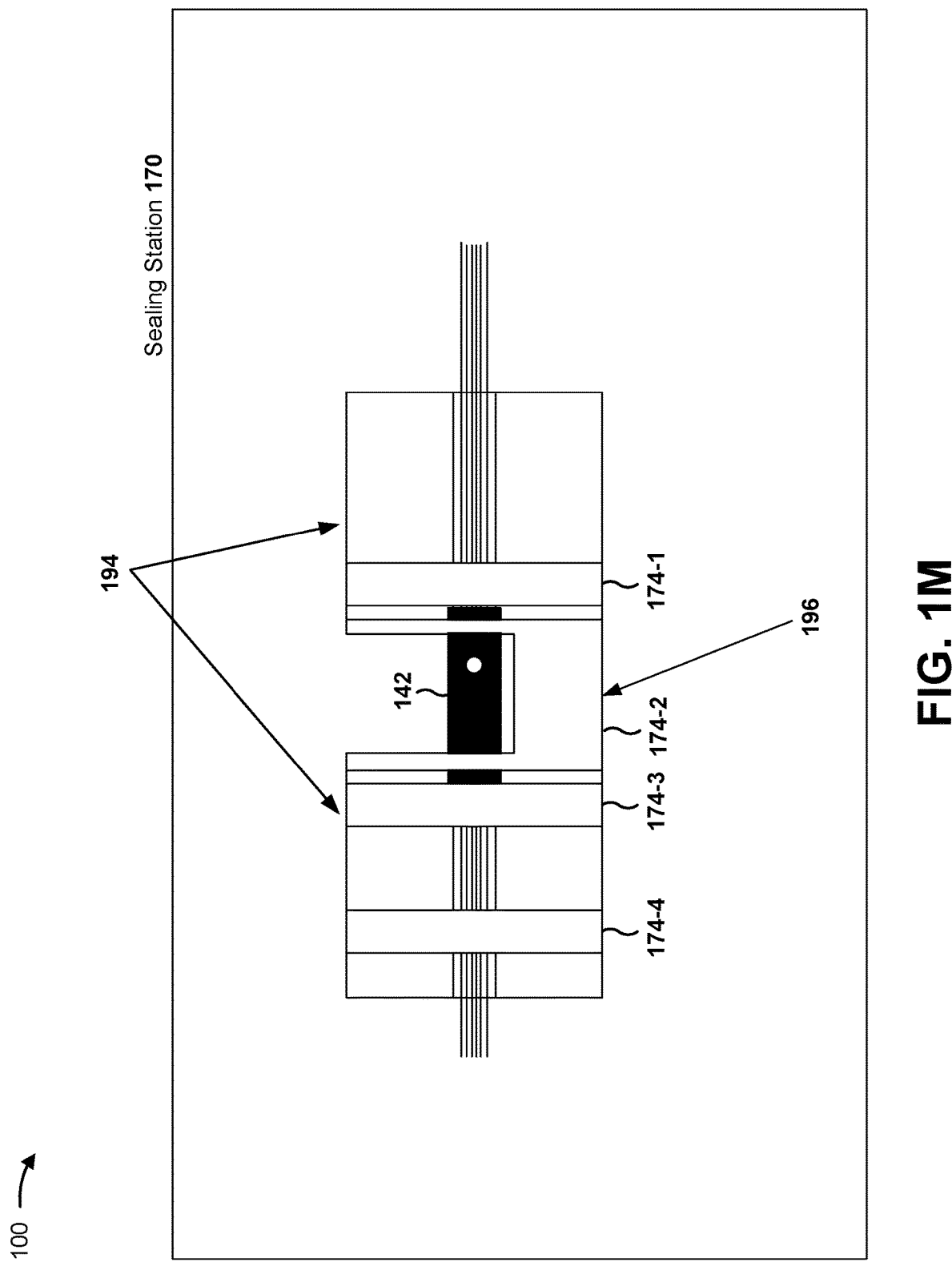

As shown in FIG. 1M, and by reference number 194, sealing clamps 174-1 and 174-3 may be clamped over optical ribbons 122-1 through 122-6. For example, sealing clamps 174-1 and 174-3 may clamp optical ribbons 122-1 through 122-6 in a groove associated with sealing station 170. As shown by reference number 196, sealing clamp 174-2 may be clamped over the tube 142. In some implementations, and as further shown by reference number 196, sealing clamps 174-1 and 174-3 may abut the ends of the tube 142. This reduces or eliminates spillage of solder during hermetic sealing of tube 142.

In some implementations, tube 142 may be hermetically sealed after sealing clamps 174-1, 174-3, and 174-4 have been clamped over optical ribbons 122-1 through 122-6 and sealing clamp 174-2 has been clamped over tube 142. For example, tube 142 may be filled with solder through an injection hole (shown as a white circle) by a component of sealing station 170. This produces an optical fiber feedthrough that is hermetically sealed and that can be used in association with a hermetic package. In addition, the produced optical fiber feedthrough may have a high fiber density within the optical fiber feedthrough (e.g., a fiber density that satisfies a threshold).

In this way, an optical fiber feedthrough with a high fiber density may be manufactured. This increases a quantity of optical fibers that can pass through the optical fiber feedthrough without changing a size of the optical fiber feedthrough. In addition, this permits use of smaller diameter fibers without needing to modify the components of the optical fiber feedthrough.

As indicated above, FIGS. 1A-1M are provided merely as an example. Other examples are possible and may differ from what was described with regard to FIGS. 1A-1M. For example, the implementations described with respect to FIGS. 1A-1M may be repeated for optical ribbons 122-7 through 122-12 (e.g., after tube 142 has been sealed around a portion of optical ribbons 122-1 through 122-6). Continuing with the previous example, to process optical ribbons 122-7 through 122-12, connector 118 may be flipped 180 degrees in clamp 104. Continuing still with the previous example, and referring back to FIG. 1C, when connector 118 is flipped 180 degrees, optical ribbons 122-7 through 122-12 would be on the bottom rather than optical ribbons 122-1 through 122-6 and the process described with regard to FIGS. 1A-1M would be repeated for optical ribbons 122-7 through 122-12.

Figure 2A:
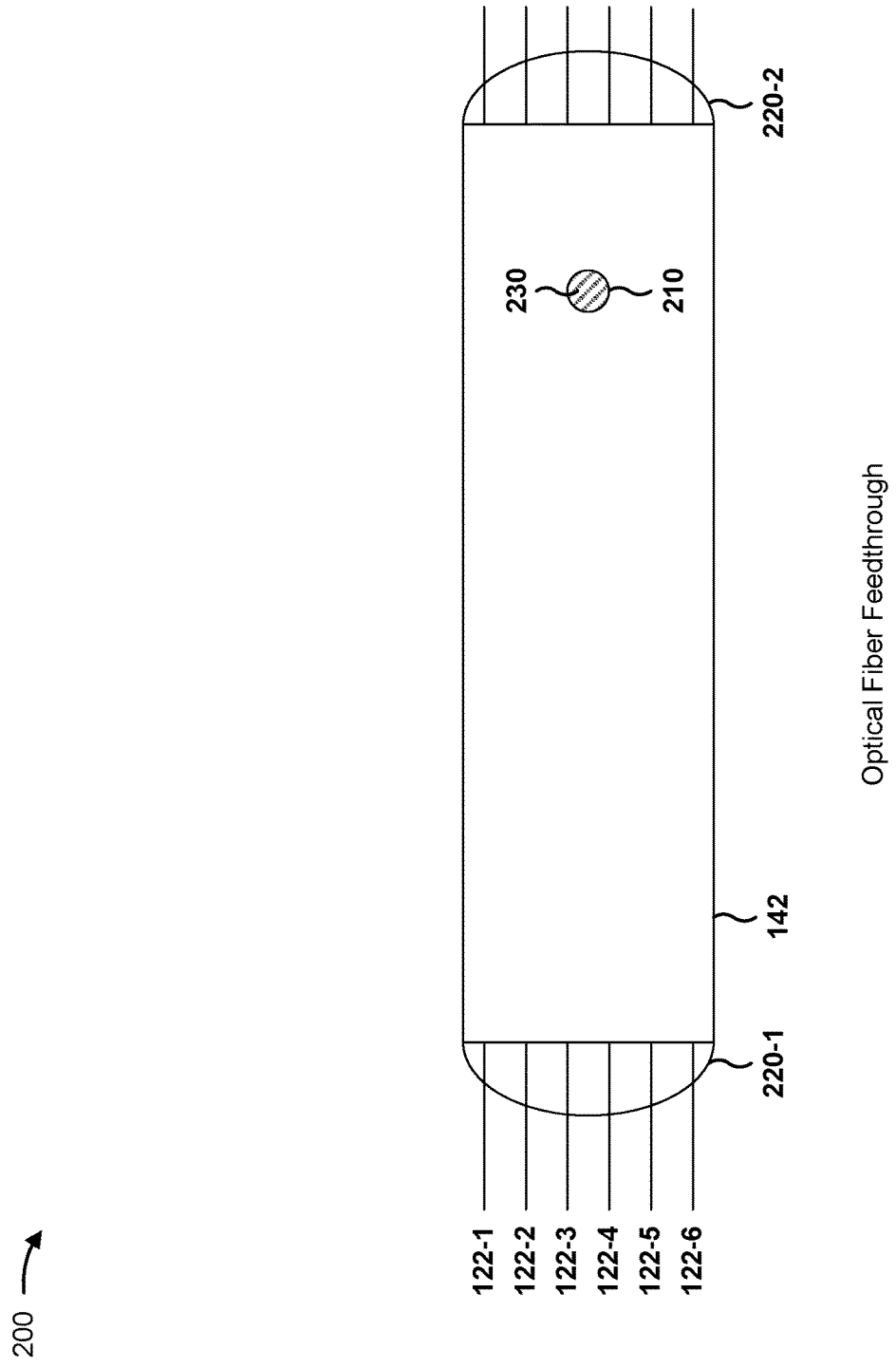
FIGS. 2A and 2B are diagrams of an example high density optical fiber feedthrough described herein.
Figure 2B:
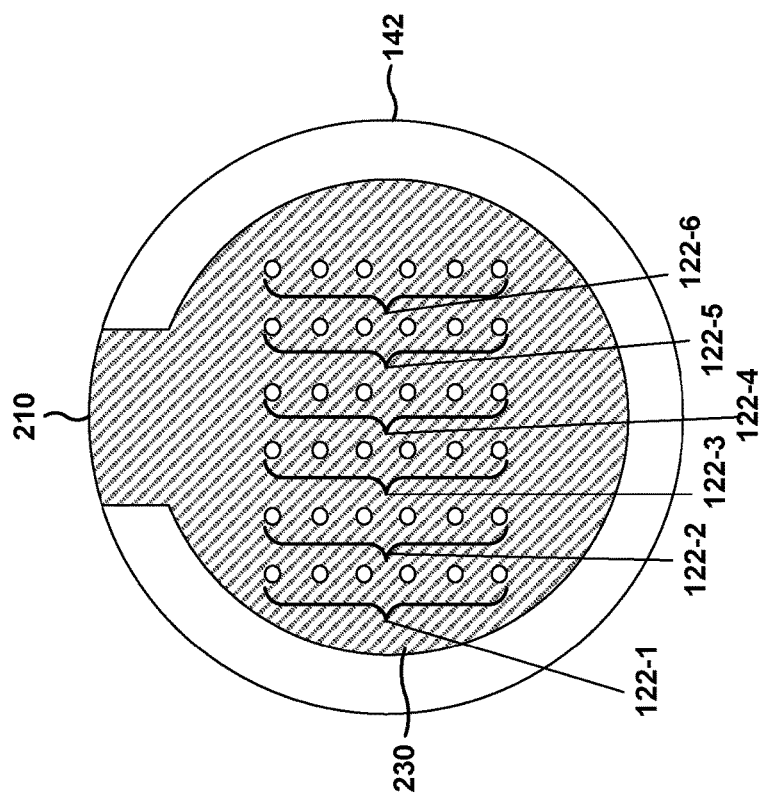

FIGS. 2A and 2B are diagrams of an example implementation 200 relating to a high density optical fiber feedthrough.

FIG. 2A shows a side view of an optical fiber feedthrough manufactured, for example, from the process described with respect to FIGS. 1A-1M. For example, FIG. 2A shows tube 142 that has been hermetically sealed around a portion (e.g., a stripped portion) of optical ribbons 122-1 through 122-6. As further shown, the optical fiber feedthrough may include an injection hole 210. In some implementations, the injection hole may have been used to fill tube 142 with solder 230 to hermetically seal tube 142 around optical ribbons 122-1 through 122-6.

As further shown in FIG. 2A, the optical fiber feedthrough may include strain reliefs 220-1 and 220-2 on each end of the optical fiber feedthrough. In some implementations, strain reliefs 220-1 and 220-2 may mechanically support optical ribbons 122-1 through 122-6 while permitting some flexibility for optical ribbons 122-1 through 122-6. For example, strain reliefs 220-1 and 220-2 may be epoxy or silicon room-temperature-vulcanizing (silicone RTV).

FIG. 2B shows a cross-section view of an optical fiber feedthrough manufactured, for example, from the process described with respect to FIGS. 1A-1M. As shown, tube 142 may be filled with solder 230. As further shown by FIG. 2B, optical ribbons 122-1 through 122-6 may be centrally positioned within tube 142. For example, optical ribbons 122-1 through 122-2 may be a threshold distance from a wall of tube 142, may be a threshold distance from each other (e.g., may not be contacting each other), may have a particular orientation and/or sequence, and/or the like.

In some implementations, each optical fiber (shown as white circles) of optical ribbons 122-1 through 122-2 may have a cladding diameter that satisfies a threshold. For example, the cladding diameter may be approximately 80 microns. Additionally, or alternatively, the cladding diameter may be less than approximately 125 microns. In some implementations, the quantity of optical fibers in the optical fiber feedthrough may satisfy a threshold. For example, as shown in FIG. 2B, the optical fiber feedthrough may have 36 optical fibers. Additionally, or alternatively, and as another example, the optical fiber feedthrough may have more than 24 optical fibers. In some implementations, the quantity of optical fibers in the optical fiber feedthrough may cause the optical fiber feedthrough to have a fiber density within the optical fiber feedthrough that satisfies a threshold. For example, the fiber density may be greater than approximately 6 fibers per square millimeter. Additionally, or alternatively, and as another example, the fiber density may be approximately 9 fibers per square millimeter, may be 9.1 fibers per square millimeter, and/or the like.

As indicated above, FIGS. 2A and 2B are provided merely as an example. Other examples are possible and may differ from what was described with regard to FIGS. 2A and 2B.

FIG. 3 is a diagram of an example implementation 300 relating a high density optical fiber feedthrough in a context of a hermetic package. For explanatory purposes, FIG. 3 only shows optical ribbon 122-3. Assume for FIG. 3 that optical ribbons 122-1 and 122-2, and 122-4 through 122-6 are present and are similar to optical ribbon 122-3. In addition, optical ribbons 122-7 through 122-12 may be associated with a different optical fiber feedthrough than optical ribbons 122-1 through 122-6 (even though connected to the same connector 118 as optical ribbons 122-1 through 122-6).

Reference number 310 shows a wall of a hermetic package. For example, connector 118 may be within an interior of the hermetic package. Reference number 320 shows a ferrule tube that provides an opening from an interior of the hermetic package to an exterior of the hermetic package. In some implementations, a portion of the optical fiber feedthrough may be soldered inside the ferrule tube to produce hermetic seal with respect to the hermetic package. As shown by reference number 330, solder (e.g., indium tin (InSn) solder), may be used to seal the optical fiber feedthrough within the ferrule tube. As shown by reference number 340, a stripped portion of optical ribbons 122-1 through 122-6 may be hermetically sealed within tube 142 of the optical fiber feedthrough. For example, solder, such as bismuth tin (BiSn) solder, may be used to hermetically seal a stripped portion of optical ribbons 122-1 through 122-6 within tube 142.

In some implementations, the optical fiber feedthrough shown in FIG. 3 may have a higher fiber density relative to another optical fiber feedthrough. For example, the optical fiber feedthrough may have the same dimensions as another optical fiber feedthrough, but may include a higher density of optical fibers relative to the other optical fiber feedthrough. In this way, a higher quantity of optical fibers may be passed through an optical fiber feedthrough (e.g., relative to an optical fiber feedthrough with the same dimensions and a lower fiber density), without modifying the dimensions of the optical fiber feedthrough, such as the dimensions of tube 142, the ferrule tube shown by reference number 320, and/or the like.

In some implementations, tube 142 may include a ferrule tube and/or a ferrule tube may include tube 142.

As indicated above, FIG. 3 is provided merely as an example. Other examples are possible and may differ from what was described with regard to FIG. 3. In some implementations, different optical ribbons 122 may have different quantities of optical fibers. For example, some implementations might include twenty-eight 125 micron core optical fibers comprising two optical ribbons with six optical fibers and two optical ribbons with eight optical fibers.

Figure 4:
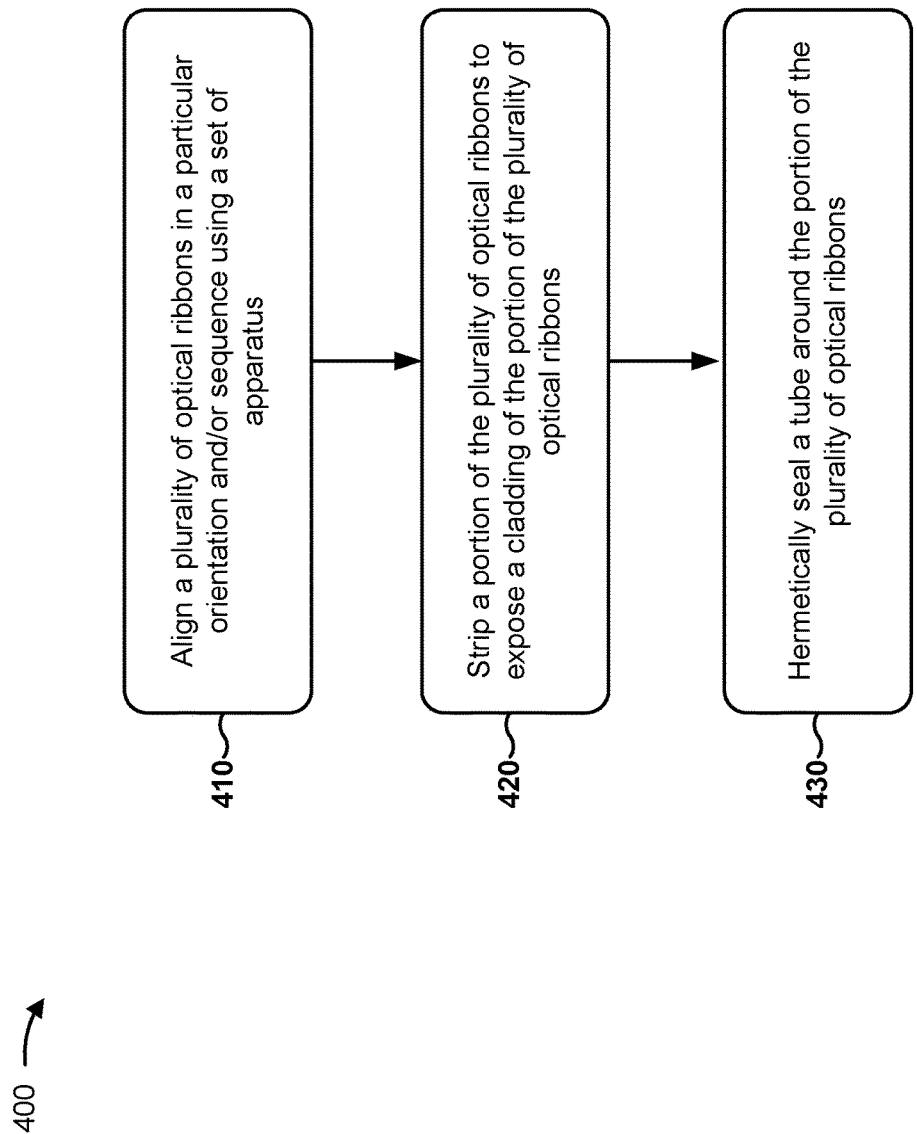
FIG. 4 is a flow chart of an example process for manufacturing a high density optical fiber feedthrough.

FIG. 4 is a flow chart of an example process 400 for manufacturing a high density optical fiber feedthrough. For example, FIG. 4 shows an example process 400 for manufacturing an optical fiber feedthrough where optical fibers within a tube of the optical fiber feedthrough have a threshold fiber density, as described in more detail elsewhere herein.

As shown in FIG. 4, process 400 may include aligning a plurality of optical ribbons in a particular orientation and/or sequence using a set of apparatus (block 410). For example, process 400 may include aligning optical ribbons 122-1 through 122-6 in a particular orientation and/or sequence using a set of apparatus.

In some implementations, process 400 may include aligning a portion of each of a plurality of optical ribbons in a particular orientation and/or sequence using a set of alignment apparatus. For example, process 400 may include aligning a portion of each of a plurality of optical ribbons to be stripped. In some implementations, process 400 may include maintaining, by a set of alignment apparatus, the particular orientation and/or sequence of the portion of each of the plurality of optical ribbons (e.g., to prevent misalignment of the portion of each the plurality of optical ribbons as the plurality of optical ribbons is moved from the set of alignment apparatus to one or more other sets of apparatus).

In some implementations, a set of alignment apparatus may include an alignment station (e.g., alignment station 102). For example, the alignment station may be used to align a portion of each of the plurality of optical ribbons (e.g., in a particular orientation and/or sequence). Additionally, or alternatively, a set of alignment apparatus may include an alignment device (e.g., post-alignment apparatus 112). For example, the alignment device may maintain a particular orientation and/or sequence of a portion of each of a plurality of optical ribbons as the plurality of optical ribbons is moved to a set of stripping apparatus (e.g., stripping devices).

In some implementations, process 400 may include arranging the portion of each of the plurality of optical ribbons in a same plane. For example, arranging the portion of each of the plurality of optical ribbons in a same plane may reduce a physical area of the portion of the plurality of optical ribbons, thereby permitting a tube to be moved around the portion.

In some implementations, a set of alignment apparatus (e.g., alignment devices) may permit a tube (e.g., tube 142) to be positioned around the plurality of optical ribbons. For example, the set of alignment apparatus may permit the tube to be positioned between the portion of each of the plurality of optical ribbons and a connector (e.g., connector 118) connected to the plurality of optical ribbons while maintaining the particular orientation and/or sequence of the plurality of optical ribbons (e.g., as described with respect to reference numbers 140, 144, and 146).

In some implementations, process 400 may include clamping the plurality of optical ribbons using a set of clamps associated with a set of alignment apparatus (e.g., alignment clamps 108-1 and 108-2). For example, the set of clamps may permit a tube to be moved around a plurality of optical ribbons while maintaining an orientation and/or sequence of the plurality of optical ribbons, as described in more detail elsewhere herein. In some implementations, process 400 may include maintaining a particular orientation and/or sequence of a portion of each of a first subset of a plurality of optical ribbons while a second subset of the plurality of optical ribbons is unclamped. For example, a set of clamps associated with a set of alignment apparatus may clamp unstripped optical ribbons of a plurality of optical ribbons while a subset of the plurality of optical ribbons is unclamped and stripped. Additionally, or alternatively, and as another example, a connector may be connected to two groups of optical ribbons and a set of clamps associated with a set of alignment apparatus may clamp a first group of optical ribbons (e.g., optical ribbons 122-1 through 122-6 in FIGS. 1A-1M) while a second group of optical ribbons remains unclamped (e.g., optical ribbons 122-7 through 122-12).

In some implementations, process 400 may include causing a tube to be positioned around a plurality of optical ribbons proximate to a connector connected to an end of each of the plurality of optical ribbons while maintaining a particular orientation and/or sequence of the portion. For example, the tube may be positioned a threshold distance from the connector in a manner similar to that described elsewhere herein.

In some implementations, process 400 may include detaching each of a plurality of optical ribbons from a set of alignment apparatus. For example, each of the plurality of optical ribbons may be detached in an order that maintains the particular orientation and/or sequence of the portion of each of the plurality of optical ribbons. Continuing with the previous example, each of the plurality of optical ribbons may be detached in the sequence prior to stripping a portion of each of the plurality of optical ribbons.

In this way, process 400 may include aligning a plurality of optical ribbons in a particular orientation and/or sequence using a set of apparatus.

As further shown in FIG. 4, process 400 may include stripping a portion of the plurality of optical ribbons to expose a cladding of the portion of the plurality of optical ribbons (block 420). For example, process 400 may include stripping a portion of optical ribbons 122-1 through 122-6 to expose a cladding of the portion of optical ribbons 122-1 through 122-6.

In some implementations, process 400 may include stripping a portion of each of a plurality of optical ribbons. For example, process 400 may include stripping a portion of each of a plurality of optical ribbons to expose a cladding of the portion of each fiber of the plurality of optical ribbons. In some implementations, process 400 may include maintaining a particular orientation and/or sequence of a portion of a plurality of optical ribbons while the portion is being stripped. For example, a set of stripping apparatus may maintain a particular orientation and/or sequence of a portion of a plurality of optical ribbons while the portion of the plurality of optical ribbons is being stripped.

In some implementations, process 400 may include removing slack from a portion of each of a plurality of optical ribbons while the portion is being stripped and/or after the portion has been stripped. For example, a set of stripping apparatus may remove slack from a portion of a plurality of optical ribbons. Additionally, or alternatively, process 400 may include applying tension to a portion of a plurality of optical ribbons while the portion is being stripped. For example, a set of stripping apparatus may apply tension to the portion while the portion is being stripped.

In some implementations, a set of stripping apparatus may maintain a particular orientation and/or sequence of a portion of a plurality of optical ribbons while the portion of each of the plurality of optical ribbons is being stripped and/or after the portion has been stripped. In some implementations, a set of stripping apparatus may include a first alignment device (e.g., post-alignment apparatus 112). For example, the first alignment device may maintain a particular orientation and/or sequence of a portion of each of a plurality of optical ribbons prior to the portion being stripped. Additionally, or alternatively, a set of stripping apparatus may include a stripping station (e.g., stripping station 152). For example, the stripping station may strip a portion of each of a plurality of optical ribbons. Additionally, or alternatively, the stripping station may maintain removal of slack from a portion of each of a plurality of optical ribbons and/or may apply tension to the portion while the portion is being stripped.

Additionally, or alternatively, a set of stripping apparatus may include a second alignment device (e.g., post-stripping apparatus 160). For example, a second alignment device may maintain removal of slack from a portion of a plurality of optical ribbons after the portion has been stripped.

In some implementations, process 400 may include attaching a plurality of optical ribbons to a set of stripping apparatus. For example, process 400 may include attaching a plurality of optical ribbons to a set of stripping apparatus in a particular order (e.g., the same order in which the plurality of optical ribbons were detached from a set of alignment apparatus). This may permit stripping of a portion of the plurality of optical ribbons, maintaining of a particular orientation and/or sequence of the portion after the portion has been stripped, and/or the like.

In this way, process 400 may include stripping a portion of the plurality of optical ribbons to expose a cladding of the portion of the plurality of optical ribbons.

As further shown in FIG. 4, process 400 may include hermetically sealing a tube around the portion of the plurality of optical ribbons (block 430). For example, process 400 may include hermetically sealing tube 142 around the portion of optical ribbons 122-1 through 122-6 (e.g., using a set of sealing apparatus). In some implementations, process 400 may include hermetically sealing a tube around a portion of a plurality of optical ribbons after causing the tube to be positioned around the portion.

In some implementations, a set of sealing apparatus (e.g., sealing devices) may include a set of clamps (e.g., sealing clamps 174-1, 174-3 and 174-4). For example, the set of clamps may be capable of being configured to maintain a particular orientation and/or sequence of a portion of a plurality of optical ribbons (e.g., while permitting a tube to be moved around a portion of each of a plurality of optical ribbons prior to hermetically sealing the tube around the portion). Additionally, or alternatively, a set of sealing apparatus may include a set of clamps to secure tube 142 (e.g., clamp 174-2). In some implementations, a set of sealing apparatus may maintain removal of slack from a portion of each of a plurality of optical ribbons. For example, the set of sealing apparatus may maintain the removal of slack while a tube is being moved around a portion of each of a plurality of optical ribbons and/or while the portion is being hermetically sealed.

In some implementations, process 400 may include maintaining a particular orientation and/or sequence of a portion of each of a plurality of optical ribbons (e.g., while the tube is being hermetically sealed). For example, a set of sealing apparatus may maintain a particular orientation and/or sequence. Additionally, or alternatively, process 400 may include removing slack from a portion of each of a plurality of optical ribbons while a tube is being hermetically sealed. For example, a set of sealing apparatus may remove slack from a portion of a plurality of optical ribbons that is being sealed.

In some implementations, process 400 may include causing a tube to be positioned in a groove structure associated with a set of sealing apparatus. For example, the groove structure may permit the tube to be positioned around a stripped portion of a plurality of optical ribbons. Additionally, or alternatively, a groove structure may position a portion of a plurality of optical ribbons centrally within a tube to be sealed around the portion (e.g., where each fiber of an optical ribbon is at least a threshold distance from a wall of the tube and/or a threshold distance from each other fiber). For example, the set of sealing apparatus may include a groove structure at either end of the tube and/or the portion to be sealed and may be configured to position the portion centrally within the tube.

In some implementations, process 400 may include modifying a proximity of a portion of each of a plurality of optical ribbons (e.g., to permit a tube to be moved around the portion prior to sealing the portion). For example, a set of sealing apparatus may modify the proximity of the portion of each of the plurality of optical ribbons. In some implementations, modifying a proximity may include reducing a distance between a portion of each of a plurality of optical ribbons to a distance that satisfies a threshold, modifying a proximity so that a tube can be positioned around the portion, and/or the like.

In some implementations, process 400 may include clamping a plurality of optical ribbons prior to hermetically sealing a tube around a portion of the plurality of optical ribbons (e.g., using a set of clamps associated with a set of sealing apparatus). In some implementations, process 400 may include maintaining a particular orientation and/or sequence of a plurality of optical ribbons while a tube is being hermetically sealed (e.g., using a set of clamps associated with a set of sealing apparatus). In some implementations, a set of clamps of a set of sealing apparatus may reduce or eliminate leakage of solder from a tube that is being sealed around a portion of a plurality of optical ribbons (e.g., while the tube is being sealed).

In some implementations, a set of clamps may include a first subset of clamps to permit a tube to be positioned around a portion of each of a plurality of optical ribbons or within a groove structure associated with a set of sealing apparatus. For example, the first subset of clamps may permit the tube to be positioned while maintaining a particular orientation and/or sequence of a portion of each of the plurality of optical ribbons and/or while maintaining removal of slack from the portion of each of the plurality of optical ribbons.

Additionally, or alternatively, a set of clamps may include a second subset of clamps. For example, the second subset of clamps may maintain a particular orientation and/or sequence of a portion of each of a plurality of optical ribbons after a tube has been positioned around the portion that has been stripped and while the tube is being hermetically sealed. Additionally, or alternatively, a set of clamps may include a third subset of clamps to prevent spillage of solder while a tube is being hermetically sealed using the solder. For example, the third subset of clamps may be hinged to permit the third set of clamps to move in a same direction as a first subset of clamps and/or a second subset of clamps.

In some implementations, process 400 may result in an optical fiber feedthrough (e.g., a hermetic optical fiber feedthrough). In some implementations, an optical fiber feedthrough may include a plurality of optical fibers. In some implementations, at least one optical fiber of a plurality of optical fibers in an optical fiber feedthrough may have a cladding diameter that satisfies a threshold. For example, the cladding diameter may be less than 125 micrometers. Additionally, or alternatively, and as another example, a cladding diameter of each of a plurality of optical fibers associated with an optical fiber feedthrough may be approximately 80 micrometers (e.g., within plus or minus one micrometer). Additionally, or alternatively, each optical fiber may have a stripped portion that is hermetically sealed within the optical fiber feedthrough. Additionally, or alternatively, an optical fiber feedthrough may include a tube that is hermetically sealed around a stripped portion of each of a plurality of optical fibers.

In some implementations, a fiber density within an optical fiber feedthrough may satisfy a threshold. For example, the fiber density may be at least approximately six fibers per square millimeter. Additionally, or alternatively, and as another example, the fiber density may be approximately nine fibers per square millimeter. In some implementations, a stripped portion of each of a plurality of optical fibers may be a threshold distance from a wall of a tube when the tube is positioned around the stripped portion. For example, a stripped portion may be between approximately 100 microns and 300 microns from a wall of a tube when the tube is positioned around the stripped portion. In some implementations, an optical fiber feedthrough may include a ferrule tube (e.g., soldered to the optical fiber feedthrough). For example, the ferrule tube may be associated with a hermetic package.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. In some implementations, process 400 may include one or more additional steps, such as applying strain reliefs to ends of tube 142 and/or leak testing.

Figure 5A:
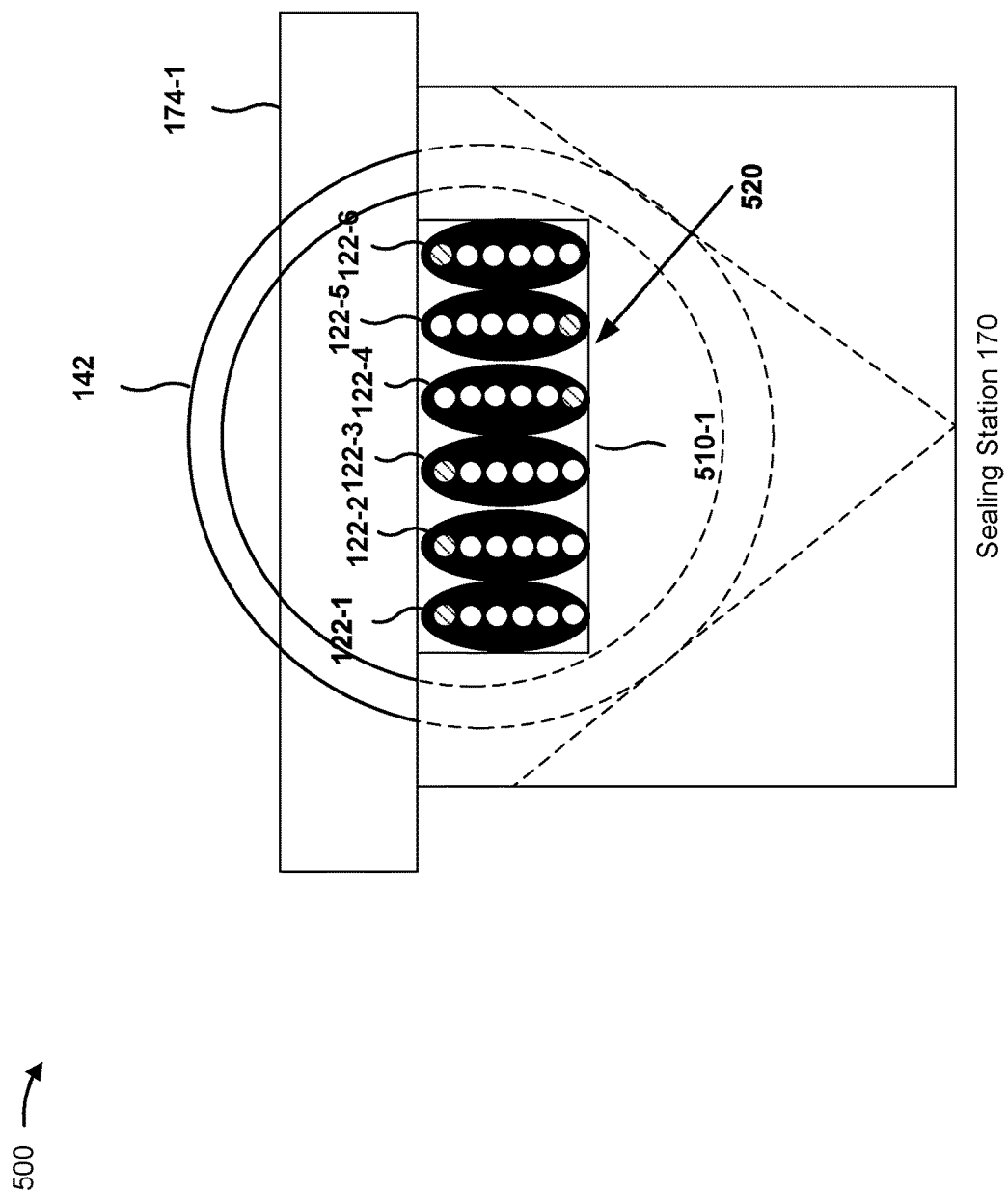

FIGS. 5A and 5B show an example implementation 500 of groove structures used in association with hermetically sealing a tube to produce a hermetic optical fiber feedthrough. FIGS. 5A and 5B show various cross sections of components of sealing station 170. Specifically, FIGS. 5A and 5B show various cross-section views of groove structures between sealing clamps 174-1 and 174-2 that are used to position tube 142 and/or optical ribbons 122-1 through 122-6 for sealing.

FIG. 5A shows a front cross-section view of sealing station 170. As shown, sealing station 170 may include a ribbon groove 510-1. In some implementations, ribbon groove 510-1 may be at an end of tube 142 (e.g., in front of tube 142). Additionally, or alternatively, ribbon groove 510-1 may be rectangular in shape. This may permit ribbon groove 510-1 to maintain an orientation and/or sequence of a stripped portion of optical ribbons 122-1 through 122-6 while tube 142 is being hermetically sealed around the stripped portion. As shown by reference number 520, ribbon groove 510-1 may be configured in a manner that aligns a portion of optical ribbons 122-1 through 122-6 centrally with tube 142. For example, ribbon groove 510-1 may align optical ribbons 122-1 through 122-6 such that a distance of stripped portions of optical ribbons 122-1 through 122-6 from a wall of tube 142 satisfies a threshold.

FIG. 5B shows another cross-section view of sealing station 170. As shown, sealing station 170 may include a tube groove 530. In some implementations, tube groove 530 may be located between ribbon groove 510-1 and ribbon groove 510-2. For example, ribbon groove 510-1 (not shown in FIG. 5B) may be located at one end of tube 142 and/or tube groove 530 and ribbon groove 510-2 may be located at another end of tube 142 and/or tube groove 530. As shown by reference number 540, tube groove 530 may be configured in a manner that causes a central portion of tube 142 to be aligned with ribbon grooves 510-1 and/or 510-2, such that optical ribbons 122-1 through 122-6 are positioned centrally within tube 142. This facilitates positioning of a portion of optical ribbons 122-1 through 122-6 within tube 142 for hermetic sealing.

As indicated above, FIGS. 5A and 5B are provided merely as an example. Other examples are possible and may differ from what was described with regard to FIGS. 5A and 5B.

In this way, an optical fiber feedthrough with a high fiber density may be manufactured. This increases a quantity of optical fibers that can pass through the optical fiber feedthrough without changing a size of the optical fiber feedthrough. In addition, this permits use of smaller diameter fibers in an optical fiber feedthrough without needing to modify the components of the optical fiber feedthrough.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, software, or combinations thereof, and/or the like. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A hermetic optical fiber feedthrough, comprising:
   a plurality of optical fibers,
     wherein at least one optical fiber, of the plurality of optical fibers, has a cladding diameter that is 125 micrometers or less, and
     wherein each optical fiber, of the plurality of optical fibers, has a stripped portion that is hermetically sealed within the hermetic optical fiber feedthrough; and
   a tube,
     wherein the tube is hermetically sealed around the stripped portion of each optical fiber of the plurality of optical fibers,
     wherein a distance between the stripped portion of each optical fiber of the plurality of optical fibers and a wall of the tube satisfies a threshold, and
     wherein a fiber density within the tube is at least approximately six fibers per square millimeter.

2. The hermetic optical fiber feedthrough of claim 1, wherein the cladding diameter is 80 micrometers.

3. The hermetic optical fiber feedthrough of claim 1, wherein the fiber density of the plurality of optical fibers is approximately nine fibers per square millimeter.

4. The hermetic optical fiber feedthrough of claim 1, further comprising:
   a ferrule tube soldered to the hermetic optical fiber feedthrough,
     wherein the ferrule tube is associated with a hermetic package.

5. The hermetic optical fiber feedthrough of claim 1, wherein the stripped portion of each optical fiber of the plurality of optical fibers is between approximately 100 microns and 300 microns from the wall of the tube when the tube is positioned around the stripped portion of each optical fiber of the plurality of optical fibers.

6. The hermetic optical fiber feedthrough of claim 1, wherein the plurality of optical fibers are arranged in a grid pattern within the tube.

7. The hermetic optical fiber feedthrough of claim 1, wherein the tube is filled with solder to hermetically seal the tube around the stripped portion of each optical fiber of the plurality of optical fibers.

8. The hermetic optical fiber feedthrough of claim 1, further comprising:
   a strain relief on an end of the hermetic optical fiber feedthrough.

9. The hermetic optical fiber feedthrough of claim 8, wherein the plurality of optical fibers are centrally positioned within the tube.

10. The hermetic optical fiber feedthrough of claim 8, wherein the strain relief mechanically supports the plurality of optical fibers.

11. The hermetic optical fiber feedthrough of claim 1, wherein the plurality of optical fibers include at least 36 optical fibers.

12. A hermetic package, comprising:
   a hermetic optical fiber feedthrough including:
   a plurality of optical fibers,
     wherein the plurality of optical fibers includes at least 24 optical fibers,
     wherein at least one optical fiber, of the plurality of optical fibers, has a cladding diameter that is 125 micrometers or less, and
     wherein each optical fiber, of the plurality of optical fibers, has a stripped portion that is hermetically sealed within the hermetic optical fiber feedthrough;
   a tube, wherein the tube is hermetically sealed around the stripped portion of each optical fiber of plurality of the optical fibers, and wherein a distance between the stripped portion of each optical fiber of the plurality of optical fibers and a wall of the tube satisfies a threshold; and a ferrule tube, wherein at least a portion of the hermetic optical fiber feedthrough is hermetically sealed inside the ferrule tube.

13. The hermetic package of claim 12, wherein a fiber density within the tube is at least approximately six fibers per square millimeter.

14. The hermetic package of claim 12, wherein the cladding diameter is 80 micrometers.

15. The hermetic package of claim 12, wherein a fiber density of the plurality of optical fibers is approximately nine fibers per square millimeter.

16. The hermetic package of claim 12, wherein the stripped portion of each optical fiber of the plurality of optical fibers is between approximately 100 microns and 300 microns from the wall of the tube when the tube is positioned around the stripped portion of each optical fiber of the plurality of optical fibers.

17. The hermetic package of claim 12, wherein the plurality of optical fibers are arranged in a grid pattern within the tube.

18. The hermetic package of claim 12, wherein the tube is filled with solder to hermetically seal the tube around the stripped portion of each optical fiber of the plurality of optical fibers.

19. The hermetic package of claim 12, further comprising:

a strain relief on an end of the hermetic optical fiber feedthrough.

20. The hermetic package of claim 19, wherein the plurality of optical fibers are centrally positioned within the tube.

* * * * *